(12) United States Patent
Plusquellic et al.

(10) Patent No.: US 12,276,599 B2
(45) Date of Patent: Apr. 15, 2025

(54) TEMPORAL MAGNIFICATION SPECTROMETER AND PERFORMING SPECTROSCOPIC TEMPORAL MAGNIFICATION

(71) Applicant: Government of the United States of America, as represented by the Secretary of Commerce, Gaithersburg, MD (US)

(72) Inventors: David Francis Plusquellic, Boulder, CO (US); Jasper Rose Stroud, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 192 days.

(21) Appl. No.: 18/142,365

(22) Filed: May 2, 2023

(65) Prior Publication Data

US 2023/0349821 A1 Nov. 2, 2023

Related U.S. Application Data

(60) Provisional application No. 63/337,201, filed on May 2, 2022.

(51) Int. Cl.
*G01N 21/31* (2006.01)
(52) U.S. Cl.
CPC ... *G01N 21/31* (2013.01); *G01N 2201/06113* (2013.01)
(58) Field of Classification Search
CPC .............. G01N 21/31; G01N 21/3586; G01N 2201/06113; G01N 2021/1789; G01J 3/10; G01J 3/433; G01J 3/453; G01J 3/42
See application file for complete search history.

(56) References Cited

U.S. PATENT DOCUMENTS 8,748,822 B1 6/2014 Gerecht et al.
9,891,165 B2 2/2018 Pate et al.
(Continued)

OTHER PUBLICATIONS

Park, G.B., et al., "Perspective: The first ten years of broadband chirped pulse Fourier transform microwave spectroscopy", The Journal of Chemical Physics, 2016, p. 200901.
Coddington, I., et al., "Dual-comb spectroscopy", Optica, 2016, p. 414-426, vol. 3 No.4.
(Continued)

*Primary Examiner* — Tarifur R Chowdhury
*Assistant Examiner* — Carlos Perez-Guzman
(74) *Attorney, Agent, or Firm* — Office of Chief Counsel for National Institute of Standards and Technology

(57) ABSTRACT

A temporal magnification spectrometer includes a dual-chirp comb source, a signal leg, a local oscillator leg, an optical detector, and a temporal magnification analyzer. The dual-chirp comb source produces optical carrier laser light. A signal comb having signal linearly chirped waveforms interacts with a sample to produce a transmitted signal comb. The local oscillator leg produces a local oscillator comb having local oscillator linearly chirped waveforms. The optical detector receives the transmitted signal and local oscillator combs and produces an RF domain signal. The analyzer receives and Fourier transforms the RF domain signal to produce an RF comb, which is sampled to produce sampled RF comb lines, which are normalized to produce temporally magnified sample frequency domain data. Intermediate sample temporal data are normalized to produce a steady-state sample spectral response.

20 Claims, 19 Drawing Sheets

(56) References Cited

U.S. PATENT DOCUMENTS

| | | | |
|---|---|---|---|
| 9,903,808 B2 | 2/2018 | Plusquellic et al. | |
| 2015/0253645 A1* | 9/2015 | Coddington | H01S 3/06712 359/328 |
| 2018/0216996 A1* | 8/2018 | Kieu | H01S 3/1112 |
| 2019/0257751 A1* | 8/2019 | Plant | G01J 3/433 |
| 2019/0391016 A1* | 12/2019 | Bourbeau Hébert | G01B 9/02008 |

OTHER PUBLICATIONS

Martin-Mateos, P., et al., "Frequency accurate coherent electro-optic dual-comb spectroscopy in real-time", Optics Express, 2018, p. 9700-9713, vol. 26 No. 8.

Martin-Mateos, P., et al., "Dual electro-optic optical frequency combs for multiheterodyne molecular dispersion spectroscopy", Optics Express, 2015, p. 21149-21158, vol. 23 No. 16.

Wang, S., et al., "Dense electro-optic frequency comb generated by two-stage modulation for dual-comb spectroscopy", Optics Letters, 2017, p. 3984-3987, vol. 42 No. 19.

Wang, S., et al., "Fast MHz spectral-resolution dual-comb spectroscopy with electro-optic modulators", Optics Letters, 2019, p. 65-68, vol. 44 No. 1.

Vieira, F.S., et al., "Tunable resolution terahertz dual frequency comb spectrometer", Optics Express, 2016, p. 30100-30107, vol. 24 No. 26.

Long, D.A., et al., "Multiheterodyne spectroscopy with optical frequency combs generated from a continuous-wave aser", 2014, Optics Letters, p. 2688-2690, vol. 39 No. 9.

Long, D.A., et al., "Multiplexed sub-Doppler spectroscopy with an optical frequency comb", Physical Review A, 2016, p. 061801, vol. 94.

Wu, R., et al., "Generation of very flat optical frequency combs from continuous-wave lasers using cascaded intensity and phase modulators driven by tailored radio frequency waveforms", Optics Letters, 2010, p. 3234-3236, vol. 35 No. 19.

Gerecht, E., et al., "Chirped-pulse terahertz spectroscopy for broadband trace gas sensing", Optics Express, 2011, p. 8973-8984, vol. 19 No. 9.

Northern, J.H., et al., "Chirped quantum cascade laser induced rapid passage signatures in an optically thick gas", Applied Physics B, 2011, p. 37-42, vol. 102.

\* cited by examiner

TEMPORAL MAGNIFICATION SPECTROMETER AND PERFORMING SPECTROSCOPIC TEMPORAL MAGNIFICATION

CROSS REFERENCE TO RELATED APPLICATIONS

This application claims the benefit of U.S. Provisional Patent Application Ser. No. 63/337,201 (filed May 2, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a temporal magnification spectrometer for performing spectroscopic temporal magnification, the temporal magnification spectrometer comprising: a dual-chirp comb source that produces optical carrier laser light; a signal leg in optical communication with the dual-chirp comb source and that: receives the optical carrier laser light from the dual-chirp comb source; produces a signal comb comprising a series of signal linearly chirped waveforms characterized by a chirp duration $\tau_{cp}$ and a signal frequency range $\Delta f_{SIG}$; and interacts the signal comb with a sample over the signal frequency range $\Delta f_{SIG}$ to produce a transmitted signal comb; a local oscillator leg in optical communication with the dual-chirp comb source and that: receives the optical carrier laser light from the dual-chirp comb source; and produces a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$; an optical detector in optical communication with the signal leg and the local oscillator leg and that: receives the transmitted signal comb from the signal leg; receives the local oscillator comb from the local oscillator leg; and produces an RF domain signal from mixing the transmitted signal comb and the local oscillator comb; and a temporal magnification analyzer in communication with the optical detector and that: receives the RF domain signal from the optical detector; subjects the RF domain signal to a Fourier transform to produce an RF comb comprising a series of RF linearly chirped waveforms; samples the RF comb to produce sampled RF comb lines from the RF comb; normalizes the magnitude and phase response of the sampled RF comb lines and produces temporally magnified sample frequency domain data from the sampled RF comb lines; subjects the sampled RF comb lines to an Inverse Fourier transform to produce intermediate sample temporal data; and normalizes the magnitude and phase response of the intermediate sample temporal data to produce a steady-state sample spectral response from the intermediate sample temporal data.

Disclosed is a process for performing spectroscopic temporal magnification, the process comprising: generating a signal comb comprising a series of signal linearly chirped waveforms characterized by a chirp duration $\tau_{cp}$ and a signal frequency range $\Delta f_{SIG}$; generating a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$; communicating the signal comb to a sample; receiving the signal comb by the sample; interacting the signal comb with the sample over the signal frequency range $\Delta f_{SIG}$ to produce a transmitted signal comb; communicating the transmitted signal comb and the local oscillator comb to an optical detector; receiving the transmitted signal comb and the local oscillator comb by the optical detector; and mixing the transmitted signal comb and the local oscillator comb by the optical detector to produce an RF domain signal that includes spectral information for temporally magnified sample frequency domain data and steady-state sample spectral response.

Disclosed is a process for performing spectroscopic temporal magnification, the process comprising: generating a signal comb comprising a series of signal linearly chirped waveforms characterized by a chirp duration $\tau_{cp}$ and a signal frequency range $\Delta f_{SIG}$; generating a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$; communicating the signal comb to a sample; receiving the signal comb by the sample; interacting the signal comb with the sample over the signal frequency range $\Delta f_{SIG}$ to produce a transmitted signal comb; communicating the transmitted signal comb and the local oscillator comb to an optical detector; receiving the transmitted signal comb and the local oscillator comb by the optical detector; mixing the transmitted signal comb and the local oscillator comb by the optical detector to produce an RF domain signal; subjecting the RF domain signal to a Fourier transform to produce an RF comb comprising a series of RF linearly chirped waveforms; sampling RF comb lines of the RF comb to obtain sampled RF comb lines; normalizing the magnitude and phase response of the RF comb to obtain temporally magnified sample frequency domain data; subjecting the sampled RF comb lines to an Inverse Fourier transform to obtain intermediate sample temporal data; and normalizing the magnitude and phase response of the intermediate sample temporal data to obtain a steady-state sample spectral response.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
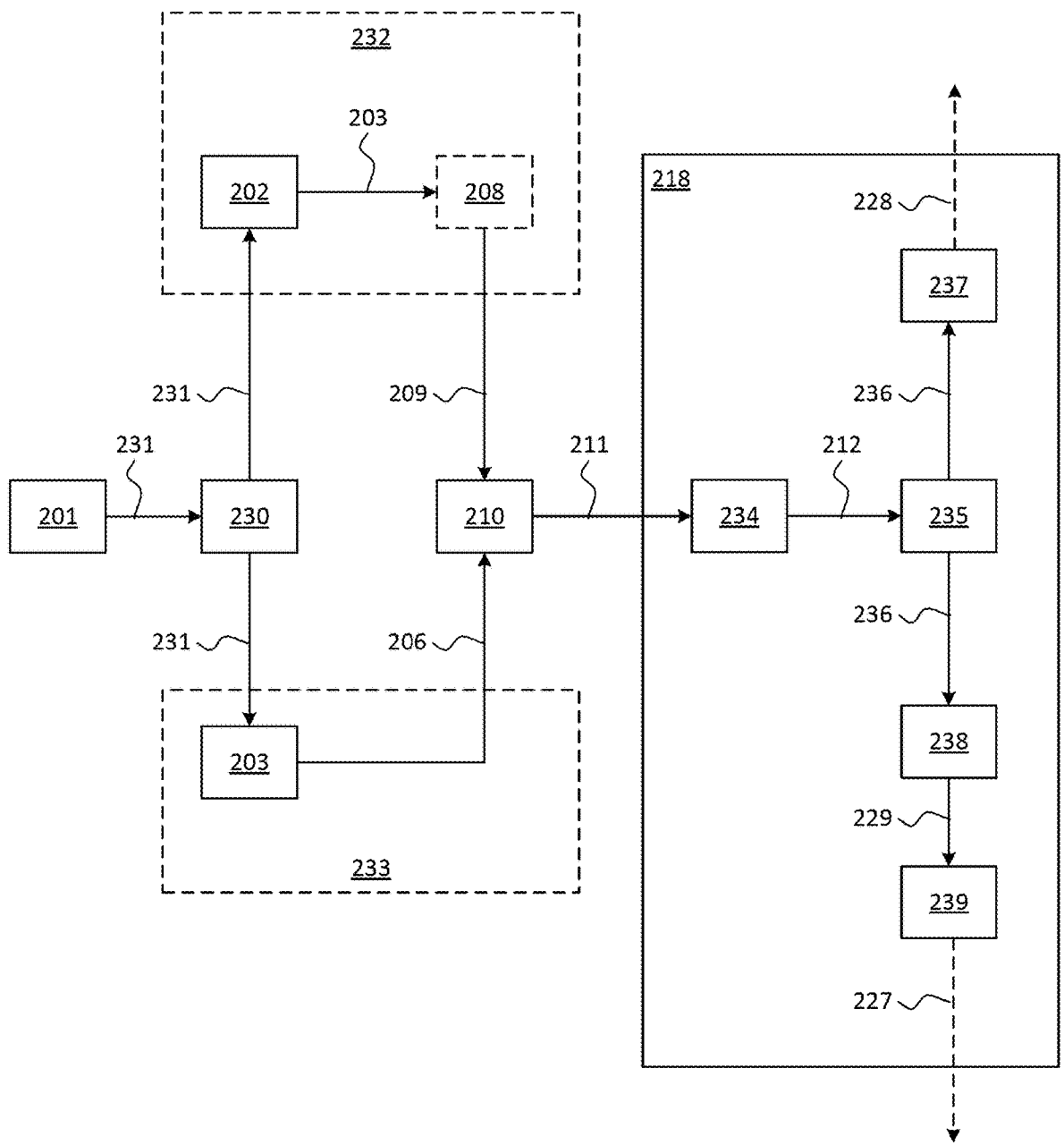
FIG. 1 shows, according to some embodiments, a temporal magnification spectrometer.

A detailed description of one or more embodiments is presented herein by way of exemplification and not limitation.

Dual-comb spectroscopy (DCS) is an optical spectroscopy technique that combines the high resolution and sensitivity of Fourier transform spectroscopy with the speed and flexibility of time-domain spectroscopy. DCS is based on the use of two optical frequency combs, which are arrays of equally spaced optical frequencies. The two combs can be generated from two independent sources and then combined and interfered on a photodetector. The interference pattern that is produced contains information about the spectral response of a sample that is placed in the optical path.

Dual-comb spectroscopy has several advantages over conventional optical spectroscopy techniques. Dual-comb spectroscopy is capable of high spectral resolution, which is limited by the coherence length of the optical frequency combs. Dual-comb spectroscopy capable of high sensitivity, which is limited by the noise in the photodetector. Dual-comb spectroscopy is capable of fast acquisition times, which are limited by the repetition rate of the optical frequency combs. Dual-comb spectroscopy has been used to measure the absorption spectra of a wide variety of materials, including gases, liquids, and solids. Dual-comb spectroscopy has also been used to measure the refractive index and dispersion of materials. Dual-comb spectroscopy is a versatile and powerful spectroscopic technique that is finding increasing applications in a wide range of fields, including chemistry, biology, materials science, and environmental science. Some of the applications of dual comb spectroscopy include: gas sensing, wherein dual-comb spectroscopy can be used to measure the concentration of gases in the atmosphere or in industrial settings; biomedical diagnostics, wherein dual-comb spectroscopy can be used to measure the concentration of biomolecules in blood or other biological fluids; material characterization, wherein dual-comb spectroscopy can be used to measure the properties of materials, such as their refractive index and dispersion; atmospheric science, wherein dual-comb spectroscopy can be used to measure the composition of the atmosphere and to study atmospheric phenomena, such as clouds and aerosols; and astrophysics, wherein dual-comb spectroscopy can be used to study the atmospheres of stars and planets.

A chirped optical frequency comb includes an optical frequency comb in which the frequency of the individual pulses can be linearly increasing or decreasing with time. Chirped optical frequency combs can be generated by modulating the frequency of a continuous-wave laser with an electro-optic modulator or by using a mode-locked laser with a nonlinear optical element. Chirped optical frequency combs can have a number of advantages over conventional optical frequency combs. Chirped optical frequency combs can be generated at much higher repetition rates, which can be useful for applications such as terahertz generation and optical coherence tomography. Chirped optical frequency combs can be more easily tuned to specific frequencies, which can be useful for applications such as spectroscopy and metrology. Chirped optical frequency combs can be more easily synchronized to other optical sources, which can be useful for applications such as optical communications and quantum information processing. Chirped optical frequency combs have found a wide range of applications, including terahertz generation, wherein chirped optical frequency combs can be used to generate terahertz waves, which are electromagnetic waves with frequencies in the range of 100 GHz to 10 THz. Terahertz waves have a number of potential applications, such as security screening, medical imaging, and material characterization. In optical coherence tomography, chirped optical frequency combs can be used to perform optical coherence tomography (OCT), which is a medical imaging technique that uses light to create high-resolution images of the interior of the body. OCT is used to diagnose a variety of medical conditions, such as glaucoma, macular degeneration, and cancer. In spectroscopy, chirped optical frequency combs can be used to perform spectroscopy, which is the study of the interaction of light with matter. Spectroscopy is used to identify and quantify the composition of materials. In metrology, chirped optical frequency combs can be used to perform metrology, which is the science of measurement. Chirped optical frequency combs are used to measure a variety of physical quantities, such as length, time, and frequency. In optical communications, chirped optical frequency combs can be used to improve the performance of optical communications systems. Chirped optical frequency combs can be used to increase the capacity of optical communications systems and to improve the accuracy of optical clocks. In quantum information processing, wherein chirped optical frequency combs can be used to perform quantum information processing, which is the use of quantum mechanics to perform information processing tasks. Chirped optical frequency combs can be used to create quantum memories and to implement quantum algorithms.

There are a number of technical limitations of conventional dual frequency comb spectrometers, with our without a single chirped frequency comb. Such limitations of conventional systems include: coherent noise, wherein conventional dual frequency comb spectroscopy relies on the interference of two optical frequency combs to produce an interferogram. Any noise that is present in the optical beams will be amplified in the interferogram, which can lead to errors in the measurement. Nonlinear effects in the optical components can also lead to errors in the measurement. For example, self-phase modulation can cause the optical pulses to spread out in time, which can reduce the accuracy of the measurement. The noise in the detector can also limit the accuracy of the measurement. The detector noise can be a dominant source of noise in dual frequency comb measurements. Conventional dual frequency comb spectroscopy can be a relatively complex technique, which can make it difficult to implement and maintain.

The technical limitations of conventional dual frequency comb spectrometers can be overcome by using two different chirped frequency combs. A dual frequency comb spectrometer with two different chirped frequency combs offers a number of advantages over conventional dual frequency combs. These advantages include improved spectral resolution, improved sensitivity, broader spectral coverage, and faster acquisition times. The improved spectral resolution is achieved by subtracting two interferograms generated by the two different chirped frequency combs. The subtraction cancels out the common-mode noise, which results in an improvement in the spectral resolution. The improved sensitivity can be achieved by adding two interferograms generated by the two different chirped frequency combs. The addition increases the signal-to-noise ratio, which results in an improvement in the sensitivity. The broader spectral coverage can be achieved by tuning the two different chirped frequency combs to different spectral regions. The faster acquisition times can be achieved by processing the two interferograms in parallel. Overall, a dual frequency comb spectrometer with two different chirped frequency combs offers a number of advantages over conventional dual frequency combs. These advantages make it a valuable tool for a wide range of applications, such as spectroscopy, metrology, and optical communications.

Temporal magnification spectrometer 200 performs spectroscopic temporal magnification. In an embodiment, with reference to FIG. 1, FIG. 2, FIG. 3, FIG. 4, FIG. 5, FIG. 6, FIG. 7, FIG. 8, FIG. 9, FIG. 10, FIG. 11, and FIG. 12, temporal magnification spectrometer 200 includes: a dual-chirp comb source 201 that produces optical carrier laser light 231; a signal leg 232 in optical communication with the dual-chirp comb source 201 and that: receives the optical carrier laser light 231 from the dual-chirp comb source 201; produces a signal comb 203 comprising a series of signal linearly chirped waveforms 204 characterized by a chirp duration $\tau_{cp}$ 214 and a signal frequency range $\Delta f_{SIG}$ 215; and interacts the signal comb 203 with a sample 208 over the signal frequency range $\Delta f_{SIG}$ 215 to produce a transmitted signal comb 209; a local oscillator leg 233 in optical communication with the dual-chirp comb source 201 and that: receives the optical carrier laser light 231 from the dual-chirp comb source 201; and produces a local oscillator comb 206 comprising a series of local oscillator linearly chirped waveforms 207 characterized by the chirp duration $\tau_{cp}$ 214 and a local oscillator frequency range $\Delta f_{LO}$ 216, such that the local oscillator frequency range $\Delta f_{LO}$ 216 is different than the signal frequency range $\Delta f_{SIG}$ 215; an optical detector 210 in optical communication with the signal leg 232 and the local oscillator leg 233 and that: receives the transmitted signal comb 209 from the signal leg 232; receives the local oscillator comb 206 from the local oscillator leg 233; and produces an RF domain signal 211 from mixing the transmitted signal comb 209 and the local oscillator comb 206; and a temporal magnification analyzer 218 in communication with the optical detector 210 and that: receives the RF domain signal 211 from the optical detector 210; subjects the RF domain signal 211 to a Fourier transform 224 to produce an RF comb 212 comprising a series of RF linearly chirped waveforms 223; samples the RF comb 212 to produce sampled RF comb lines 236 from the RF comb 212; normalizes the magnitude and phase response of the sampled RF comb lines 236 and produces temporally magnified sample frequency domain data 228 from the sampled RF comb lines 236; subjects the sampled RF comb lines 236 to an Inverse Fourier transform 225 to produce intermediate sample temporal data 229; and normalizes the magnitude and phase response of the intermediate sample temporal data 229 to produce a steady-state sample spectral response 227 from the intermediate sample temporal data 229.

In an embodiment, dual-chirp comb source 201 includes a single free-running laser. In an embodiment, dual-chirp comb source 201 includes a dual laser configuration comprising two independent free-running lasers. In an embodiment, the temporal magnification spectrometer 200 with the dual laser configuration provides sum frequency generation and difference frequency generation.

In an embodiment, signal leg 232 includes signal modulator 202 that receives optical carrier laser light 231 from the dual-chirp comb source 201 and produces signal comb 203. In an embodiment, signal modulator 202 includes an electro-optical phase modulator that produces signal comb 203 from optical carrier laser light 231. In an embodiment, signal modulator 202 directly modulates optical carrier laser light 231 with a chirped waveform microwave source that produces signal comb 203 from optical carrier laser light 231.

In an embodiment, local oscillator leg 233 includes signal modulator 202 that receives optical carrier laser light 231 from dual-chirp comb source 201 and produces local oscillator comb 206. In an embodiment, signal modulator 202 includes an electro-optical phase modulator that produces local oscillator comb 206 from optical carrier laser light 231. In an embodiment, signal modulator 202 directly modulates optical carrier laser light 231 with a chirped waveform microwave source that produces local oscillator comb 206 from optical carrier laser light 231.

In an embodiment, temporal magnification analyzer 218 includes transform unit 234 that subjects RF domain signal 211 to Fourier transform 224 and produces RF comb 212. In an embodiment, temporal magnification analyzer 218 includes comb line sample unit 235 that samples RF comb 212 and produces sampled RF comb lines 236 from RF comb 212. In an embodiment, temporal magnification analyzer 218 includes temporal magnification normalization unit 237 that normalizes the magnitude and phase response of sampled RF comb lines 236 and produces temporally magnified sample frequency domain data 228 from sampled RF comb lines 236. In an embodiment, temporal magnification analyzer 218 includes inverse transform unit 238 that subjects sampled RF comb lines 236 to Inverse Fourier transform 225 and produces intermediate sample temporal data 229 from sampled RF comb lines 236. In an embodiment, temporal magnification analyzer 218 includes steady-state normalization unit 239 that normalizes the magnitude and phase response of intermediate sample temporal data 229 and produces steady-state sample spectral response 227 from intermediate sample temporal data 229.

In an embodiment, temporal magnification analyzer 218 operates in the near-IR and THz regions and maps optical spectra into the RF region with a resolution spanning more than three decades. In an embodiment, temporal magnification spectrometer 200 magnifies temporal dynamics of the sample. In an embodiment, the sample comprises chemical system, a molecular system, an optical system, or a medium. In an embodiment, temporal magnification spectrometer 200 converts a section of an optical spectrum in the optical domain (optical bandwidth) to the radio frequency (RF) domain (RF bandwidth). In an embodiment, temporal magnification spectrometer 200 produces steady-state spectroscopic information and a magnified view of the temporal dynamics of sample 208.

It should be appreciated that temporal magnification spectrometer 200 and performing spectroscopic temporal magnification are technologically superior to conventional technology and provide magnified temporal dynamics and that can be used to preform sub-doppler spectroscopy or molecular dynamic studies in the gas and condensed phases. The optical bandwidth is down converted into the RF region where it can be readily detected. Down conversion can be done using asymmetric chirp rates between sample and reference combs. The asymmetric chirp design provides down conversion from the optical to the RF domains and magnifies the temporal dynamics over a wide range of time scales. By adjusting the chirped waveform parameters, the resolution and magnification can be scaled over three orders of magnitude, making it an extremely robust and flexible system. The electronics are dependent on programmable waveform generation, where the chirp duration, bandwidth, and number of bits define the temporal limits of the system, while the optics may be limited by laser sources, electro-optic modulation, and phase fluctuations between sample and reference legs.

Figure 2:
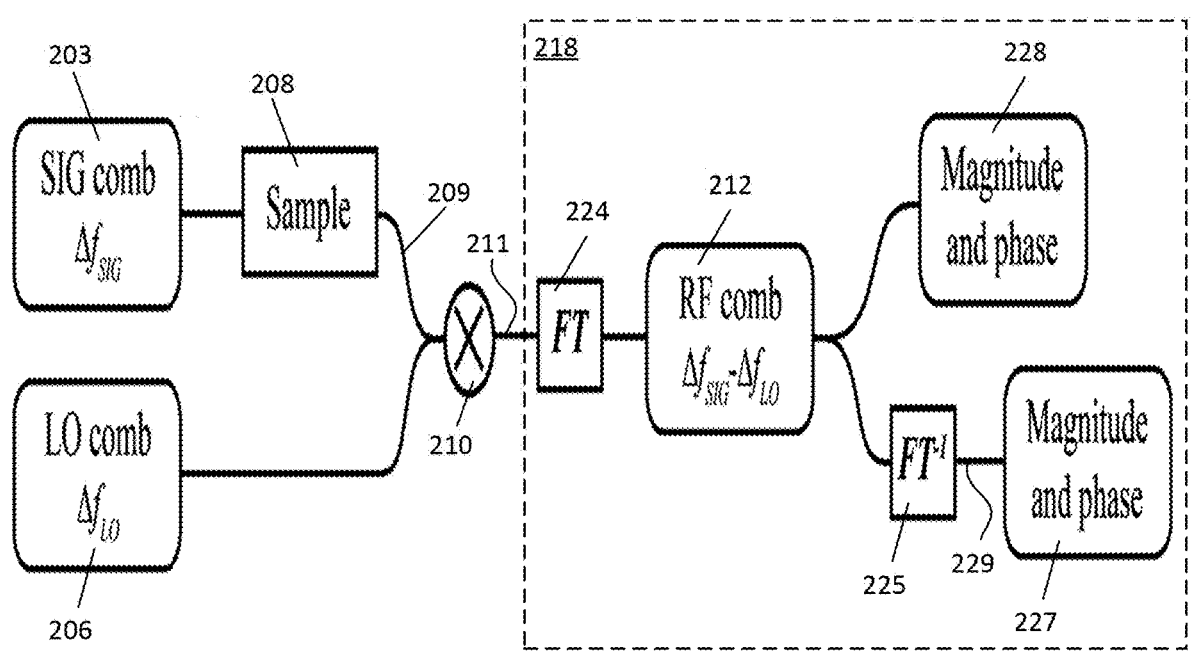
FIG. 2 shows, according to some embodiments, a temporal magnification spectrometer.
Figure 3:
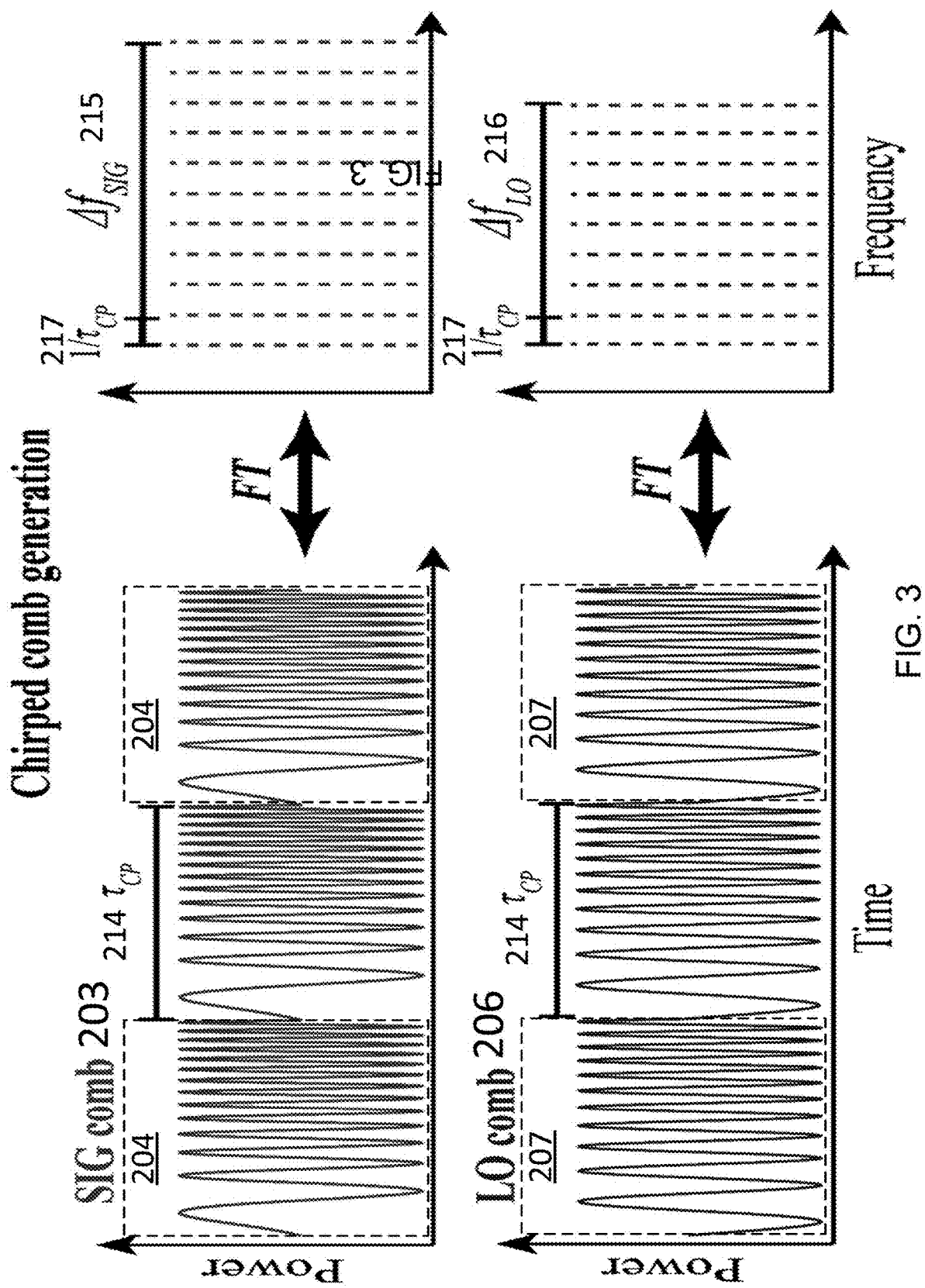
FIG. 3 shows, according to some embodiments, a signal comb and a local oscillator comb.

In an embodiment, with reference to FIG. 1, FIG. 2, FIG. 3, FIG. 4, and FIG. 5, signal comb 203 and local oscillator comb 206 are generated on optical carrier laser light 231 respectively from a series of signal linearly chirped waveforms 204 (also referred to as signal chirps) and local oscillator linearly chirped waveforms 207 (also referred to as local oscillator chirps) (see FIG. 3). Signal linearly chirped waveform 204 is characterized by chirp duration $\tau_{cp}$ 214 and signal frequency range $\Delta f_{SIG}$ 215. Local oscillator linearly chirped waveform 207 is characterized by chirp duration $\tau_{cp}$ 214 and local oscillator frequency range $\Delta f_{LO}$ 216. Chirp duration $\tau_{cp}$ 214 inversely defines the spacing 217 of the comb teeth $1/T_{CP}$. Signal frequency range $\Delta f_{SIG}$ 215 defines the span of signal comb 203. Local oscillator frequency range $\Delta f_{LO}$ 216 defines the span of local oscillator comb 206. With reference to FIG. 3, signal comb 203 and local oscillator comb 206 are generated with equal chirp duration $\tau_{cp}$ 214 and different frequency ranges, i.e., signal frequency range $\Delta f_{SIG}$ 215 is different from local oscillator frequency range $\Delta f_{LO}$ 216. Signal frequency range $\Delta f_{SIG}$ 215 defines the optical bandwidth that is sent to sample 208, and local oscillator frequency range $\Delta f_{LO}$ 216 defines the frequency range of the down converted RF linearly chirped waveform 223.

Figure 4:
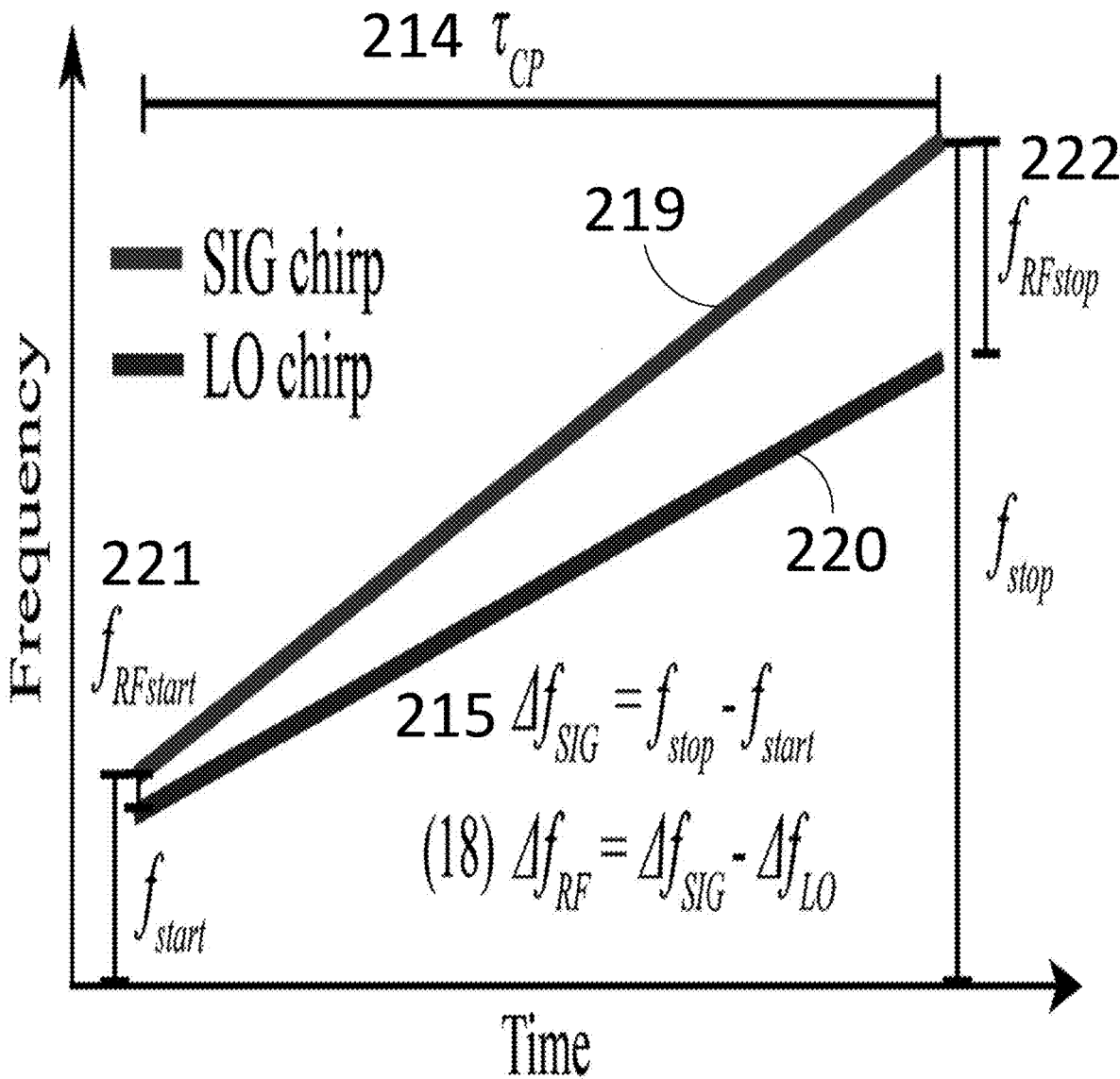
FIG. 4 shows, according to some embodiments, shows a graph of frequency versus for a differential chirp spectrogram.
Figure 5:
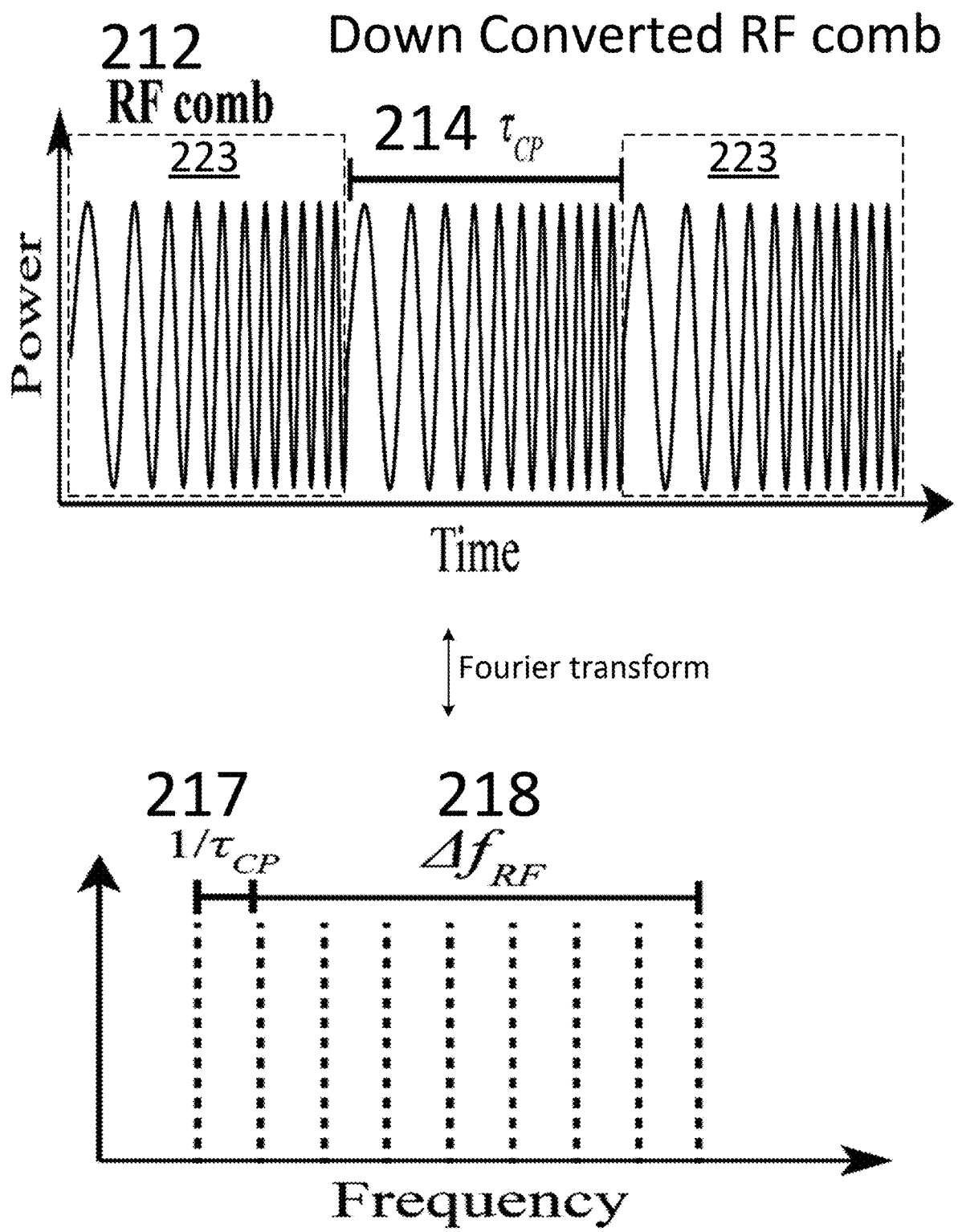
FIG. 5 shows, according to some embodiments, an RF comb.
Figure 6:
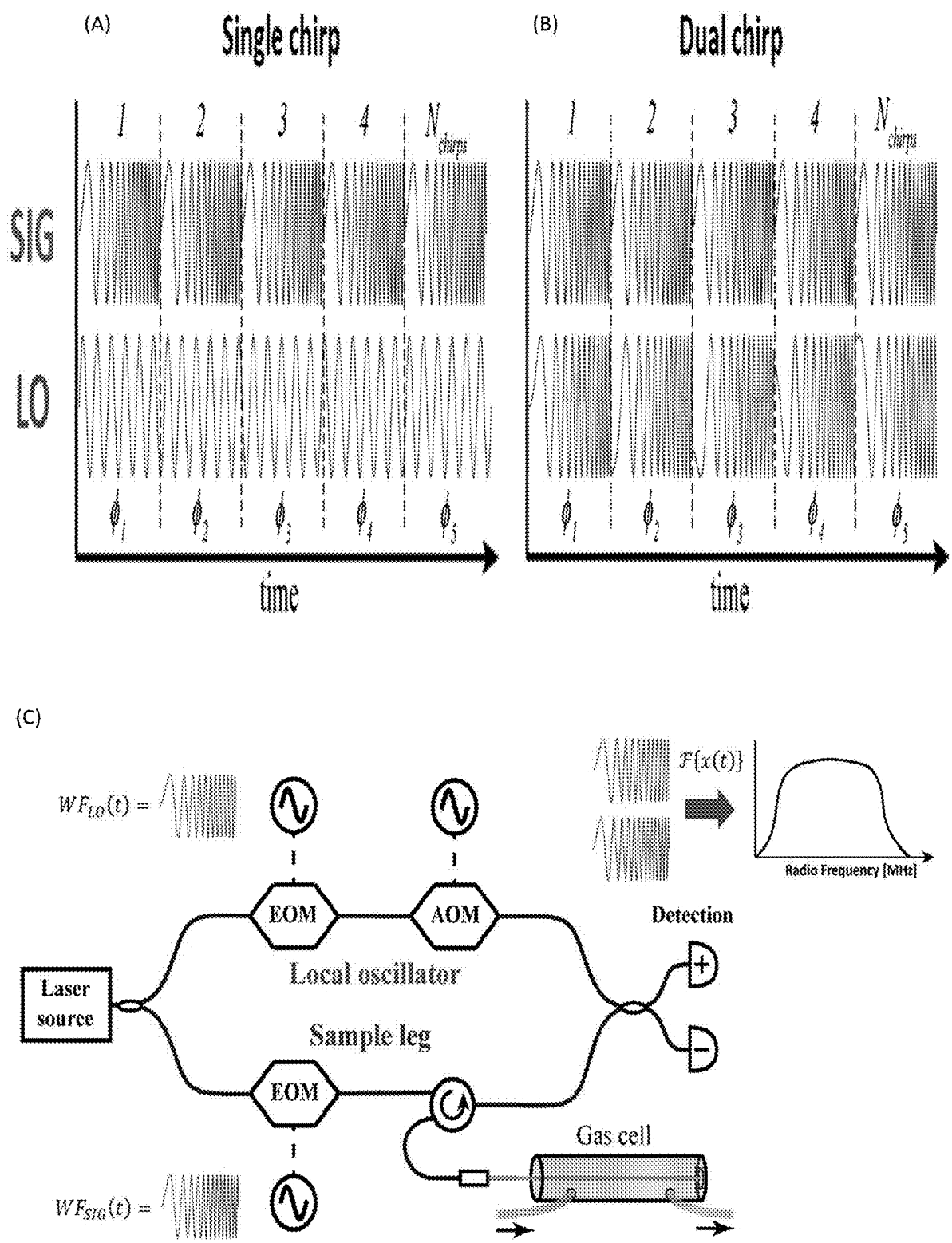
FIG. 6 shows a difference between single chirp combs (panel A) and dual chirp combs (B), wherein the dual chirp combs can be produced and included in a dual comb spectrometer shown in panel C.

Referring to FIG. 1 and FIG. 2 FIG. 1, signal comb 203 is communicated to and received by sample 208 (e.g., a chemical system, a molecular system, an optical system, and the like) that is probed by the frequency range defined by signal frequency range $\Delta f_{SIG}$ 215. As a result, transmitted signal comb 209 is produced as an output signal of signal comb 203 interacting with sample 208. Transmitted signal comb 209 is mixed with local oscillator comb 206 on optical detector 210, producing RF domain signal 211 in the RF domain. FIG. 4 shows SIG chirp spectrogram 219 and LO chirp spectrogram 220 and indicates how signal linearly chirped waveform 204 and local oscillator linearly chirped waveform 207 interact to produce RF linearly chirped waveform 223 that ranges from $f_{RFstart}$ 221 to $f_{RFstop}$ 222, with the same chirp duration $\tau_{cp}$ 214 as signal comb 203 and local oscillator comb 206. This series of RF linearly chirped waveforms 223 (also referred to as RF chirps), as shown in FIG. 5, is subject to Fourier transform 224 to produce RF comb 212 in the RF domain that is defined by a differential chirp rate, i.e., signal frequency range $\Delta f_{RF}$ 226 and that carries information from sample 208 over signal frequency range $\Delta f_{SIG}$ 215. The magnitude and phase information are recovered to produce temporally magnified sample frequency domain data 228 by sampling the complex-valued comb teeth of RF comb 212. Due to the chirp of local oscillator comb 206, transient signals are magnified by the applied quadratic phase in the frequency domain, resulting in unique line shapes that depend on the LO chirp rate. Subjecting RF comb 212 to Inverse Fourier transform 225 recovers steady-state sample spectral response 227.

In an embodiment, temporal magnification spectrometer 200 includes: an optical source, an optical splitter in optical communication with the optical source, a plurality of electro-optic modulators in optical communication with the optical splitter, a plurality of microwave waveform generators, a sample in optical communication with the modulators, an optical combiner in communication with the sample and the local oscillator leg and the signal leg, an optical detector, wherein the optical source provides laser light that is split among a local oscillator leg and a signal leg by the optical splitter; the local oscillator leg and signal leg are electro-optically phase modulated or directly modulated with chirped waveform microwave sources, and the transmitted signal comb 209 from sample 208 and local oscillator comb 206 are mixed to generate a down converted radiofrequency (RF) signal as RF comb 212 by optical detector 210.

Temporal magnification spectrometer 200 can be made of various elements and components that are fabricated or obtained from a supplier. Optical components and electronics can be selected for operation with laser wavelengths that can include visible light from 400 nm to 700 nm, near infrared light from 700 nm to 1000 nm, short-wave infrared from 1000 nm to 3000 nm, and the like. Wavelengths can be selected based on optical properties of sample 208. Operation with such laser wavelengths can provide integration with a large number of fiber optic components, making temporal magnification spectrometer 200 scalable and compatible with off-the-shelf optical characterization tools.

Elements of temporal magnification spectrometer 200 can be made of a material that is physically or chemically resilient in an environment in which temporal magnification spectrometer 200 is disposed. Exemplary materials include a metal, ceramic, thermoplastic, glass, semiconductor, and the like. The elements of temporal magnification spectrometer 200 can be made of the same or different material and can be monolithic in a single physical body or can be separate members that are physically joined.

Temporal magnification spectrometer 200 can be made in various ways. It should be appreciated that temporal magnification spectrometer 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, temporal magnification spectrometer 200 can be disposed in a terrestrial environment or space environment. Elements of temporal magnification spectrometer 200 can be formed from silicon, silicon nitride, and the like although other suitable materials, such ceramic, glass, or metal can be used.

Temporal magnification spectrometer 200 has numerous advantageous and unexpected benefits and uses. In an embodiment, a process for performing spectroscopic temporal magnification includes: generating signal comb 203 including a series of signal linearly chirped waveforms 204 characterized by chirp duration $\tau_{cp}$ 214 and signal frequency range $\Delta f_{SIG}$ 215; generating local oscillator comb 206 comprising a series of local oscillator linearly chirped waveforms 207 characterized by chirp duration $\tau_{cp}$ 214 and local oscillator frequency range $\Delta f_{LO}$ 216, such that local oscillator frequency range $\Delta f_{LO}$ 216 is different than the signal frequency range $\Delta f_{SIG}$ 215; communicating signal comb 203 to sample 208; receiving signal comb 203 by sample 208; interacting signal comb 203 with sample 208 over signal frequency range $\Delta f_{SIG}$ 215 to produce transmitted signal comb 209; communicating transmitted signal comb 209 and local oscillator comb 206 to optical detector 210; receiving transmitted signal comb 209 and local oscillator comb 206 by optical detector 210; and mixing transmitted signal comb 209 and local oscillator comb 206 by optical detector 210 to produce RF domain signal 211 that includes spectral information for temporally magnified sample frequency domain data 228 and steady-state sample spectral response 227. In an embodiment, performing spectroscopic temporal magnification includes subjecting RF domain signal 211 to Fourier transform 224 to produce RF comb 212 including a series of RF linearly chirped waveforms 223; sampling RF comb lines of RF comb 212 to obtain sampled RF comb lines; normalizing the magnitude and phase response of RF comb 212 to obtain temporally magnified sample frequency domain data 228; subjecting the sampled RF comb lines to Inverse Fourier transform 225 to obtain intermediate sample temporal data 229; and normalizing the magnitude and phase response of intermediate sample temporal data 229 to obtain steady-state sample spectral response 227. In an embodiment, performing spectroscopic temporal magnification includes acquiring a background interferogram between signal comb 203 and local oscillator comb 206 in an absence of sample 208 interacting with signal comb 203.

In an embodiment, a process for performing spectroscopic temporal magnification includes: generating signal comb 203 including a series of signal linearly chirped waveforms 204 characterized by chirp duration $\tau_{cp}$ 214 and signal frequency range $\Delta f_{SIG}$ 215; generating local oscillator comb 206 including a series of local oscillator linearly chirped waveforms 207 characterized by chirp duration $\tau_{cp}$ 214 and local oscillator frequency range $\Delta f_{LO}$ 216, such that local oscillator frequency range $\Delta f_{LO}$ 216 is different than signal frequency range $\Delta f_{SIG}$ 215; communicating signal comb 203 to sample 208; receiving signal comb 203 by sample 208; interacting signal comb 203 with sample 208 over signal frequency range $\Delta f_{SIG}$ 215 to produce transmitted signal comb 209; communicating transmitted signal comb 209 and local oscillator comb 206 to optical detector 210; receiving transmitted signal comb 209 and local oscillator comb 206 by optical detector 210; mixing transmitted signal comb 209 and local oscillator comb 206 by optical detector 210 to produce RF domain signal 211; subjecting RF domain signal 211 to Fourier transform 224 to produce RF comb 212 comprising a series of RF linearly chirped waveforms 223;

sampling RF comb lines of RF comb 212 to obtain sampled RF comb lines; normalizing the magnitude and phase response of RF comb 212 to obtain temporally magnified sample frequency domain data 228; subjecting the sampled RF comb lines to Inverse Fourier transform 225 to obtain intermediate sample temporal data 229; and normalizing the magnitude and phase response of intermediate sample temporal data 229 to obtain steady-state sample spectral response 227.

In an embodiment, a process for performing spectroscopic temporal magnification includes: connecting the optical components; programing waveforms for modulating dual-chirp comb source 201; producing signal comb 203 and local oscillator comb 206 according to the programmed waveforms; acquiring a background RF interferogram in absence of sample 208; acquiring a sample RF interferogram; extracting comb teeth from background and sample RF combs; normalizing the comb teeth for frequency domain data; Fourier transforming the sample and background combs; and normalizing the obtained transform for time domain data. Here, the optical components are connected such that there is an RF signal at optical detector 210 after passing through both electro-optic phase modulators or from directly modulated sources. The programed chirped waveforms have the same duration but different bandwidths that serve to define the optical resolution and bandwidth of the RF combs. The background interferogram is recorded without a sample. The sample interferogram is recorded with the sample. The Fourier transform of a series of interferograms forms a comb with teeth spaced by the inverse of the chirp durations. From the RF comb teeth, the complex (real and imaginary) responses of the sample are normalized by the background to get the temporally magnified frequency domain data. The complex responses from the RF comb teeth of the sample and background are inverse Fourier transformed and then normalized to get the time domain data.

Figure 7:
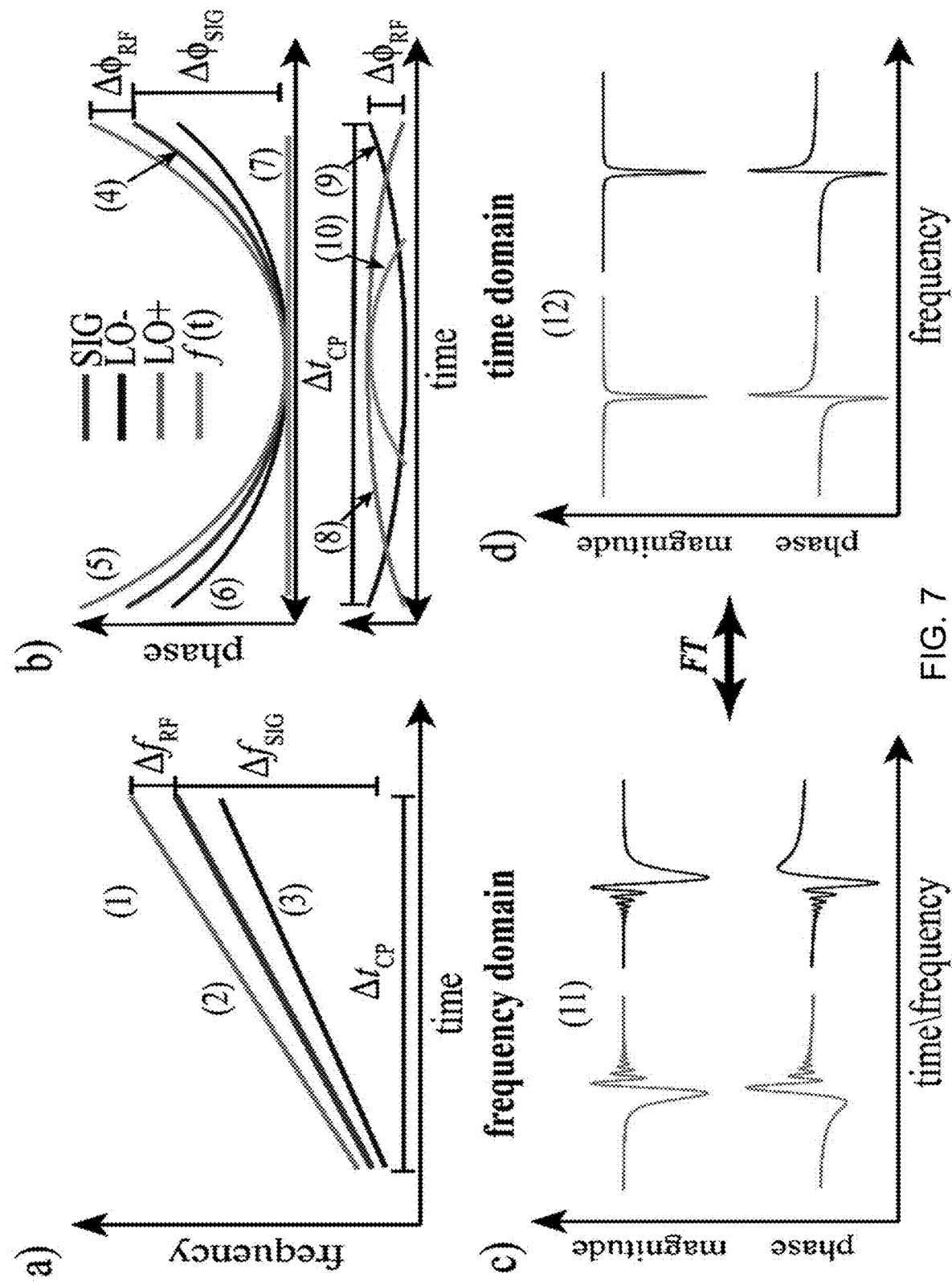
FIG. 7 shows, according to some embodiments, that (a) chirped LO down conversion applies (b) quadratic phase shift to a transient sample response that results in (c) temporally magnified frequency domain data and (d) unmagnified time domain data (e.g., a steady-state sample spectral response).

Two different RF responses of the temporally magnified signals are possible depending on whether the local oscillator (LO) chirped bandwidth is larger or smaller than the SIG chirped bandwidth. FIG. 7 shows how for a single resonance, two different LO chirps interact to produce mirror image frequency domain spectra while having identical time domain spectra. The spectrogram in FIG. 7a shows the SIG chirp in red (1) and the two LO chirps, one with a slightly larger chirp ($\Delta f_{LO} > \Delta f$) in light blue (2) relative to the SIG chirp, and one with a slightly smaller chirp ($\Delta f_{LO} < \Delta f$), in purple (3). FIG. 7b shows an overlay of only the quadratic phase terms of the chirps shown in FIG. 7a, the probe in red (4), and the two LO chirps in light blue (5) and purple (6). The difference between the LO phases and the SIG phase (lower subpanel of FIG. 7b), describes the mapping of the probe frequency comb to the RF domain. The temporal response of the sample, in yellow (7), acquires the quadratic phase response from mixing with the LO chirps (5) and (6). While the spectral content in the probe's (SIG) chirped pulse (1) is mapped with the differential quadratic terms in light blue (8), and purple (9). The large quadratic phase magnifies (10) the temporal dynamics of the sample in the frequency domain (11) by the ratio of the differential phase (8, 9) to full LO chirp phase. The time domain data (12) are not magnified, showing regular response from the resonance. Here the differential chirp down conversion system produces unique results for the same SIG chirp pulse probe and different LO chirp parameters.

It is contemplated that temporal magnification spectrometer 200 and performing spectroscopic temporal magnification can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product);

a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

Various ways of making and operating certain components of temporal magnification spectrometer 200 as well as data acquisition and data reduction can be found in U.S. Pat. Nos. 8,748,822 and 9,903,808, the disclosure of each of which is incorporated herein by reference in its entirety.

The articles and processes herein are illustrated further by the following Example, which is non-limiting.

Example

A Dual Chirped-Pulse Electro-Optical Frequency Comb Method for Simultaneous Molecular Spectroscopy and Dynamics Studies: Formic Acid in the THz Region An electro-optic dual comb system based on chirped-pulse waveforms is used to simultaneously acquire temporally magnified rapid passage signals and normal spectral line shapes from the back-transformation to the time domain. Multi-heterodyne THz wave generation and detection is performed with the difference frequency mixing of two free-running lasers. The method is used to obtain THz spectra of formic acid in the 10 cm$^{-1}$ to 20 cm$^{-1}$ (300 GHz-600 GHz) region over a range of pressures. The method is widely applicable across other spectral regions for investigations of the transient dynamics and spectroscopy of molecular systems.

Dual-comb spectroscopy has revolutionized optical sensing by providing a straightforward and precise method for the down conversion and compression of the optical probe comb into the radio frequency (RF) domain to enhance detection sensitivity. Electro-optic dual comb methods, while often limited in spectral coverage, are highly flexible across a wide range of optical resolutions and measurement time scales. When both combs are generated from the same laser source, complicated phase locking schemes are often not necessary to achieve transform limited readout performance.

As opposed to electro-optic frequency comb generation that consists of series of transform limited pulses with flat spectral phase, here we use a series of linear chirped pulses that have a quadratic phase response to form optical frequency combs. Linear chirps facilitate the production of flat comb spectra and provide continuous power at the detector that helps alleviate dynamic range issues. In contrast to traditional dual comb setups, the probe and local oscillator (LO) sources have the same repetition rate, or chirp duration, but differ in the chirp range. The relationship between the LO and probe combs can be described as, $$\Delta f_{LO} = \Delta f \pm \delta f_{BW} \tag{1}$$

where $\Delta f_{LO}$ is the chirp range of the LO comb, $\Delta f$ is the chirp range of the probe comb, and $\delta f_{BW}$ is the small difference in the chirp range that defines the RF comb bandwidth. This mapping is done when the LO chirp beats with the probe chirp, generating sum and difference frequency components. The detected RF chirp can be described as a cosine waveform that includes a quadratic phase term, $$RF(t) = I_{RF}(t)\cos\left(\pm 2\pi\left(\delta f_0 t + \frac{\delta f_{BW} t^2}{2\tau_{CP}}\right)\right) \tag{2}$$

where $\delta f_0$ is some offset frequency between the two combs, $\tau_{CP}$ is the duration of the chirp, and $I_{RF}(t)$ is half the product of the probe and LO field strengths. The quadratic term maps the information from the probe onto an RF bandwidth defined by the difference in chirp rates, $\delta f_{BW}$.

When the chirped waveforms are repeated for a fixed set of LO phase slips, interleaved RF combs are formed in the frequency domain that are unique to each of the electro-optic modulator's (EOMs) (±) sidebands and orders (harmonics). When the applied chirped field excites a resonance, the resulting transient oscillations no longer have the quadratic phase term of the probe. In contrast to Eq. (2), the transient mixing with the LO chirp can be described as, $$RF_{trans}(t) = I_{trans}(t)\cos\left(2\pi\left(\delta f_{trans} t + \frac{\Delta f_{LO} t^2}{2\tau_{CP}}\right)\right) \tag{3}$$

where, $\delta f_{trans}$ is the frequency of the resonance response, and $I_{trans}(t)$ is half the product of this transient response and LO field strengths. Here, the quadratic term is defined by the LO chirped pulse and results in the temporally magnified transient oscillations observed in the RF comb spectrum.

This scheme has been shown by us to magnify the temporal dynamics of carbon dioxide in the near infrared and of water vapor in the THz region. We demonstrate this differential chirped-pulse down conversion using a dual-chirped-pulse difference-frequency electro-optical frequency comb system (DCP-DF-EOFC) to measure the THz spectrum of formic acid. The magnified and steady state spectral responses are recovered from this dual comb setup in multiple configurations. We also show how the sign of the quadratic phase shift can be flipped through simple modification of the LO chirped-pulse parameters to effectively reverse the direction of the temporal response in the magnified spectrum.

The system diagram is shown in FIG. 1, wherein two continuous wave lasers, an external cavity diode laser (ECDL) and a Ti:Sapphire (Ti:Sapp) ring laser, are used to generate THz radiation. The laser outputs are coupled into fiber, equally split, and sent to optical modulators (see FIG. 1). The two acousto-optic modulators (AOM) are centered ≈50 MHz and differ in driving frequency (VCO) by $\Delta f_{AOM}$=300 kHz. The two EOMs are driven by a dual channel arbitrary waveform generator (AWG) programmed with chirped pulse waveforms. The combined fiber outputs with 20-30 mW each illuminate a photomixer transmitter (Tx) and receiver (Rx) [7]. The Tx photomixer (11 V bias) output is free-spaced coupled through a 1 m long gas cell using a pair of gold-coated off-axis parabolic mirrors. The optical pathlengths of each leg are approximately matched at the detector to reduce phase drift. The THz light on Rx is mixed with the optical beat signals to generate an RF electrical response which is amplified and digitized (ADC, 1 megasample/s, MS/s).

The chirped pulse waveform driving the Tx leg spans from $f_{Tx,start}$=0.5 GHz to $f_{Tx,stop}$=10.5 GHz in a 10 ms duration. The Rx leg is a chirped pulse with the same duration but spans a slightly different bandwidth where $f_{Rx,start}=f_{Tx,start}\pm f_{RF,start}$ and $f_{Rx,stop}=f_{Tx,stop}\pm f_{RF,stop}$, and $f_{RF,start}$=5 kHz and $f_{RF,stop}$=164 kHz. The Tx chirped pulse is repeated ten times while each Rx waveform is phase shifted to separate the orders (harmonics) generated in the EOMs. The 100 ms long AWG waveforms (32 GS/s) are repeated ten times to form a continuous 1 s record. The resulting 1 s RF interferograms are Fourier transformed to give the RF spectrum with a comb spacing of 100 Hz that spans 159 kHz on each side of the 300 kHz AOM beat note (with a 5 kHz center offset). The comb teeth are sampled and normalized to recover the magnitude and phase of the spectra in the frequency domain (Fourier transform of the recorded interferogram). Prior to normalization to the background signal, the comb teeth are inverse Fourier transformed to obtain the steady-state spectrum here defined as the time domain spectrum. Through the unique Fourier transform properties of linear chirps, the frequency domain and time domain spectra are obtained simultaneously. Normalization removes the quadratic phase term that defines a linear chirp and allows for transformation between the two domains.

Figure 8:
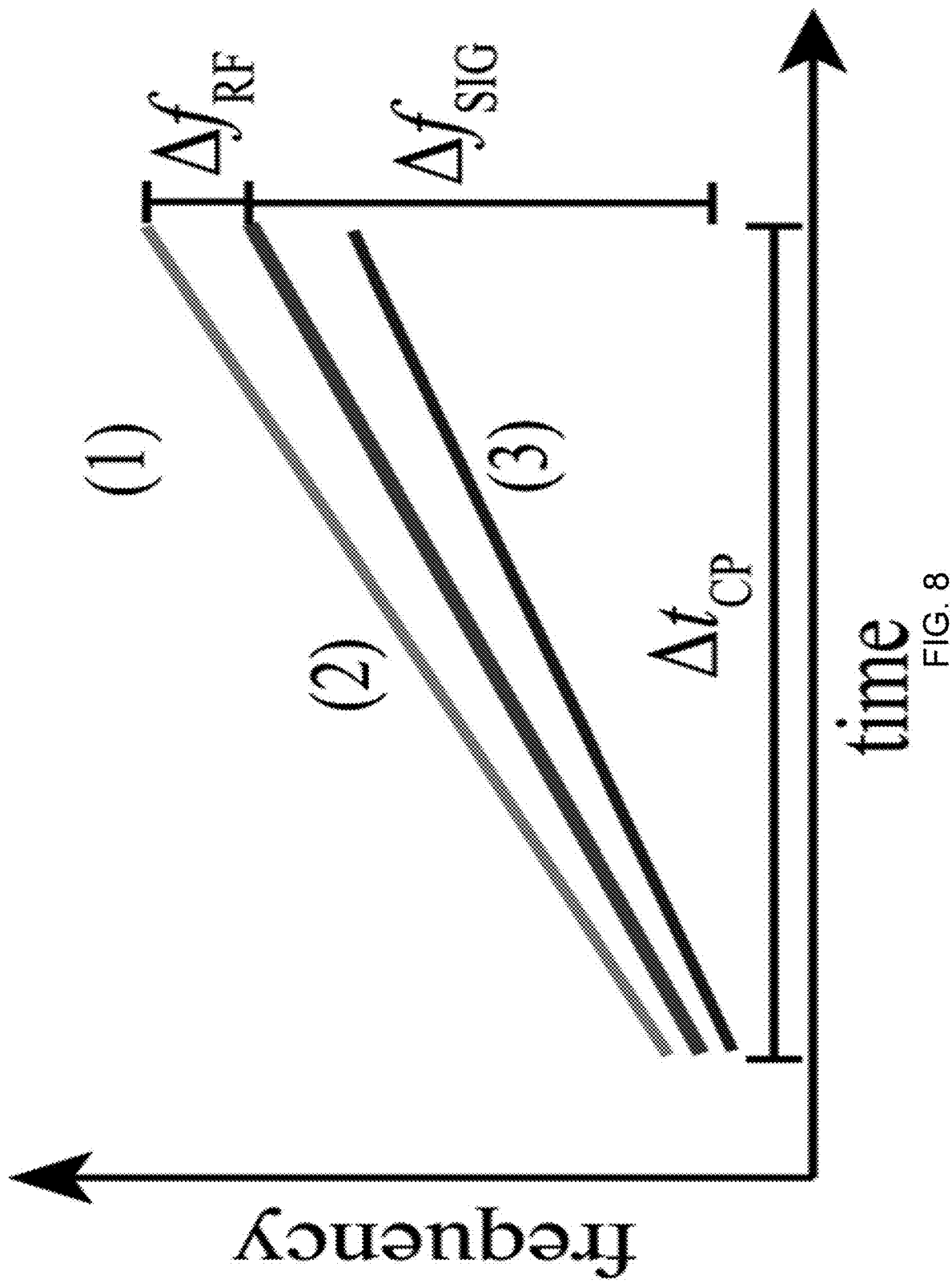
FIG. 8 shows an enlarged view of panel A from FIG. 7, wherein the spectrogram of chirped waveforms shows the relationship between the two different Rx waveforms, in purple and blue, and the Tx waveform, in red.
Figure 9:
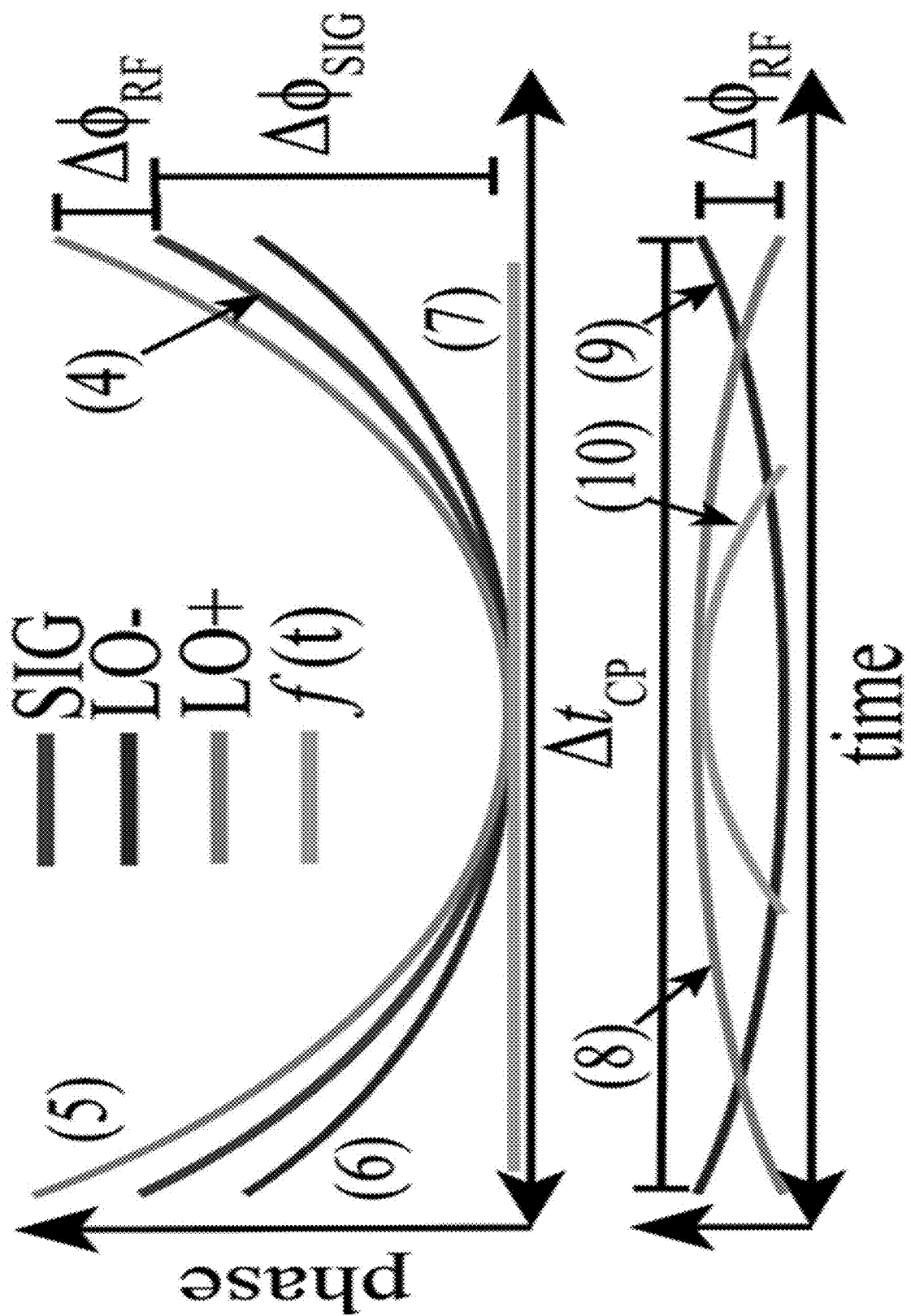
FIG. 9 shows an enlarged view of panel B from FIG. 7, wherein quadratic terms of the chirps are shown in the top panel and arguments in the lower panel.
Figure 10:
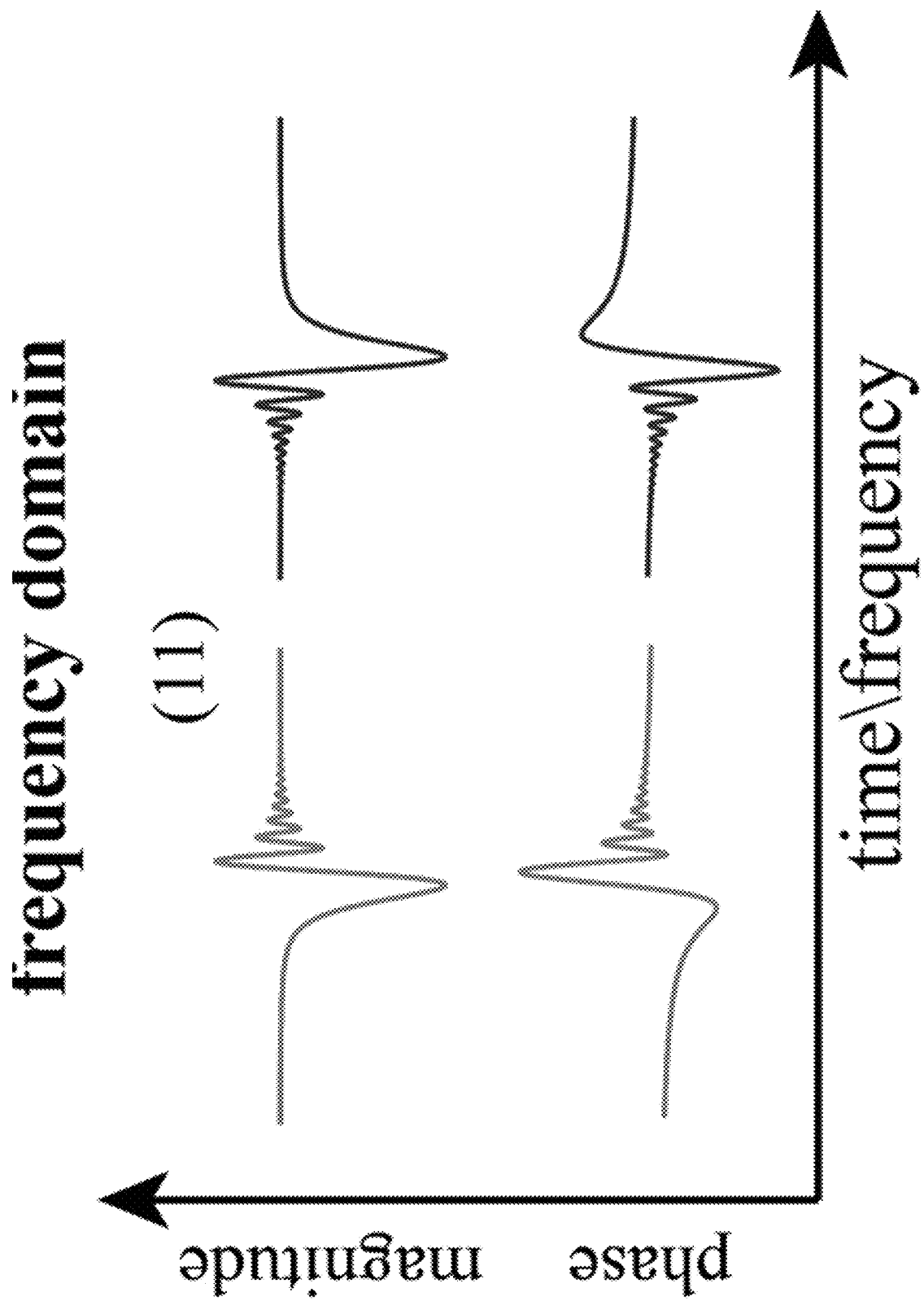
FIG. 10 shows an enlarged view of panel C from FIG. 7 for a rapid passage frequency domain spectra of a single resonance.

To better illustrate the expected forms of the temporally magnified signals, two different LO chirped pulse waveforms were applied to the Rx leg to down-convert the spectrum of the Tx probe comb. FIG. 7 shows how for a single resonance, the different Rx chirps interact to produce mirror image frequency domain spectra while having identical time domain spectra. The spectrogram in FIG. 8 shows the Tx chirp in red (and an offset copy of it, dashed black line) and the two Rx chirps, one with a slightly larger chirp ($\Delta f_{LO} > \Delta f$) in blue relative to the Tx chirp, and one with a slightly smaller chirp ($\Delta f_{LO} < \Delta f$), in purple. FIG. 9 shows an overlay of only the quadratic terms of the chirps shown in FIG. 8, the probe in red, and the two Rx chirps in purple and light blue. The difference in these phases (lower subpanel of FIG. 9), which are the arguments in Eqs. 2 and 3, describes the mapping of the probe frequency comb to the RF domain. The temporal response of the sample at $\delta f_{trans}$ in Eq. 3, in yellow, acquires the quadratic phase response from mixing with the LO chirp. While the spectral content in the probe's (Tx) chirped pulse is mapped with the differential term given in Eq. 2, the transient response is magnified by the quadratic term of the LO chirped pulse given in Eq. 3. The normalized frequency domain response from a sample resonance, shown in FIG. 10, is found from, $$FD(t) = C_{sig}(n)/C_{Bkg}(n) \quad (4)$$

where $C_{sig}(n)$ and $C_{Bkg}(n)$ are the complex values of the signal and background combs, respectively. The direction of the decaying oscillations (ripples) depends on the sign of the RF quadratic phase response (FIG. 9). However, when the inverse Fourier transform (iFT) is applied prior to normalization, the steady state (i.e., normal line shape) spectra in the time domain are recovered as follows, $$TD(f) = iFT\{C_{sig}(n)\}/iFT\{C_{Bkg}(n)\} \quad (5)$$

Figure 11:
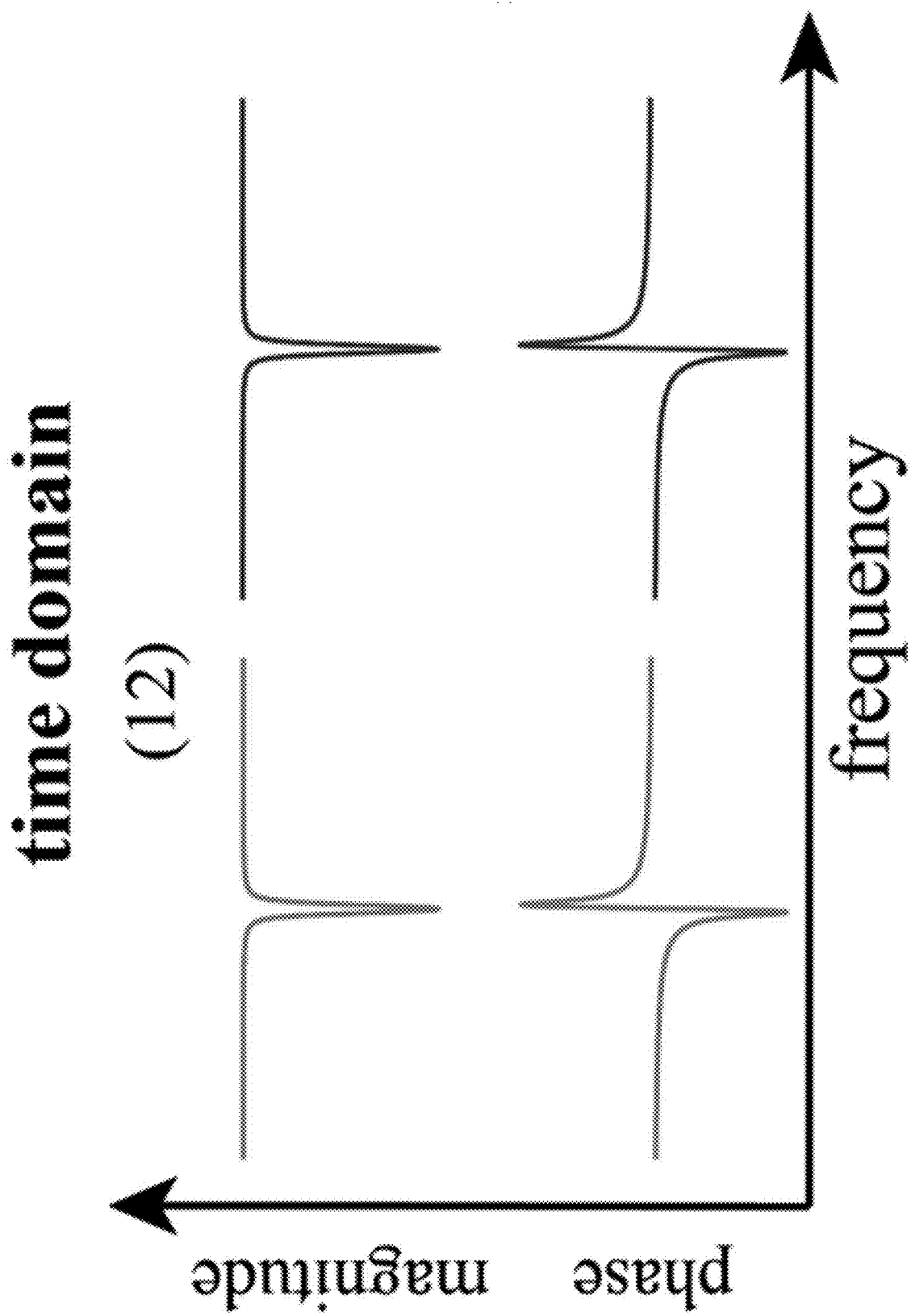
FIG. 11 shows an enlarged view of panel D from FIG. 7 for a normal line shape time domain spectra for both Rx chirps.
Figure 12:
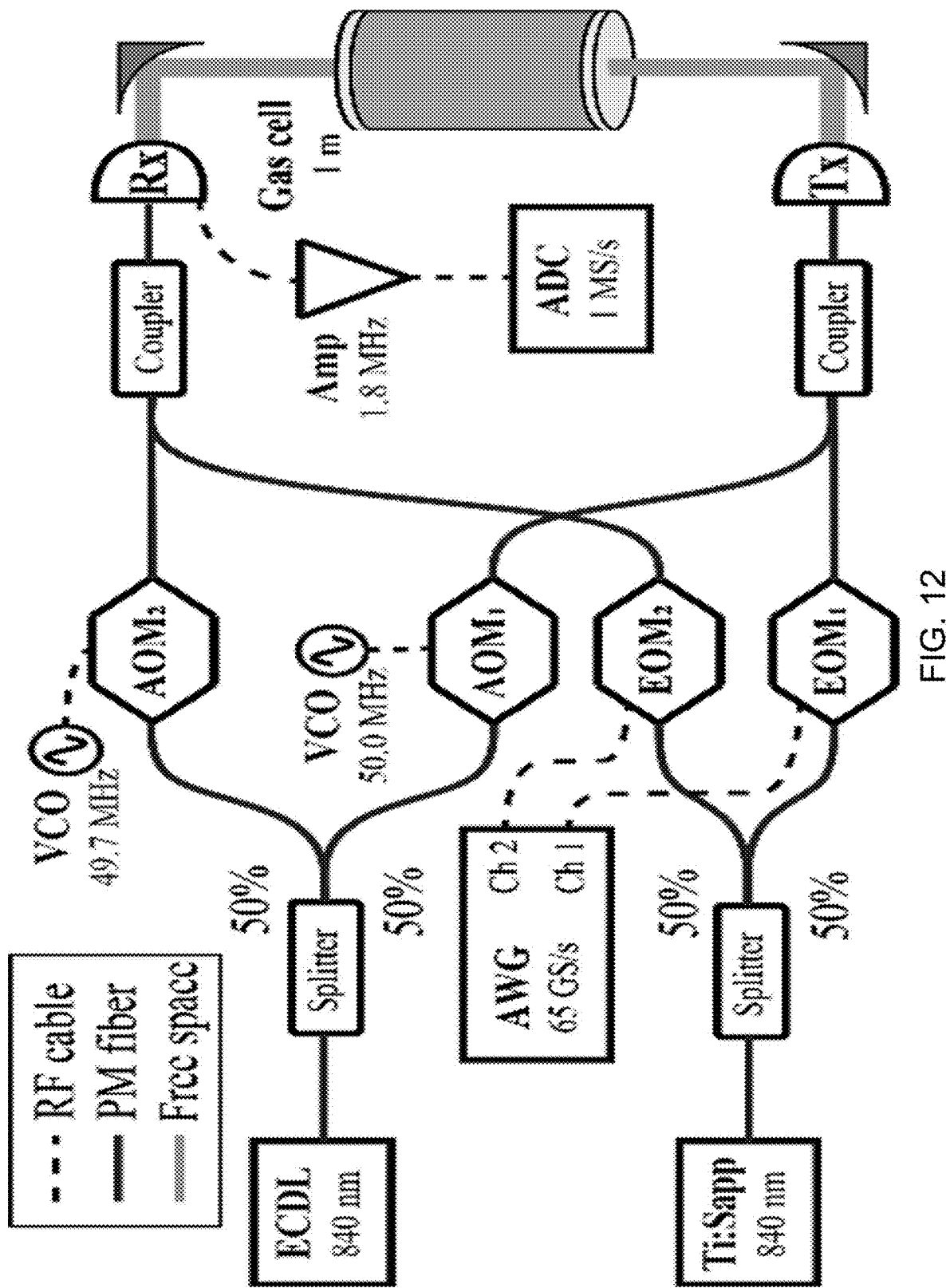
FIG. 12 shows, according to some embodiments, A temporal magnification spectrometer.

These two spectra are nearly identical for both Rx combs as illustrated in FIG. 11. The temporally magnified frequency comb spectra contain distinct post-resonance oscillations that are interpreted as the rapid passage responses of the molecular resonance. Therefore, the frequency domain spectra have a temporal response in contrast to the frequency response of the time domain spectra. These concepts are demonstrated here through investigations of the rapid passage dynamics and spectroscopy of formic acid in the THz region.

The DCP-DF-EOFC system is used to perform gas phase spectroscopy of formic acid. Three spectral regions are investigated that are centered at 12.1 cm$^{-1}$, 15.7 cm$^{-1}$, and 19.3 cm$^{-1}$ (362 GHz, 472 GHz, and 581 GHz, respectively). Over these spectral regions, the down-converted THz signal strength and corresponding signal-to-noise ratio varies by four-fold. For each region, two sets of data were collected at 133 Pa, 267 Pa, 400 Pa, and 667 Pa, using two different chirped pulses for the Rx comb. Each data set produces four spectra that include the magnitude and phase responses in both the frequency and time domains. The frequency domain spectra show rapid passage line shapes that converge to normal Voigt profiles with increasing pressure, while the time domain spectra always show normal Voigt profiles having regular pressure-broadened widths.

Figure 13:
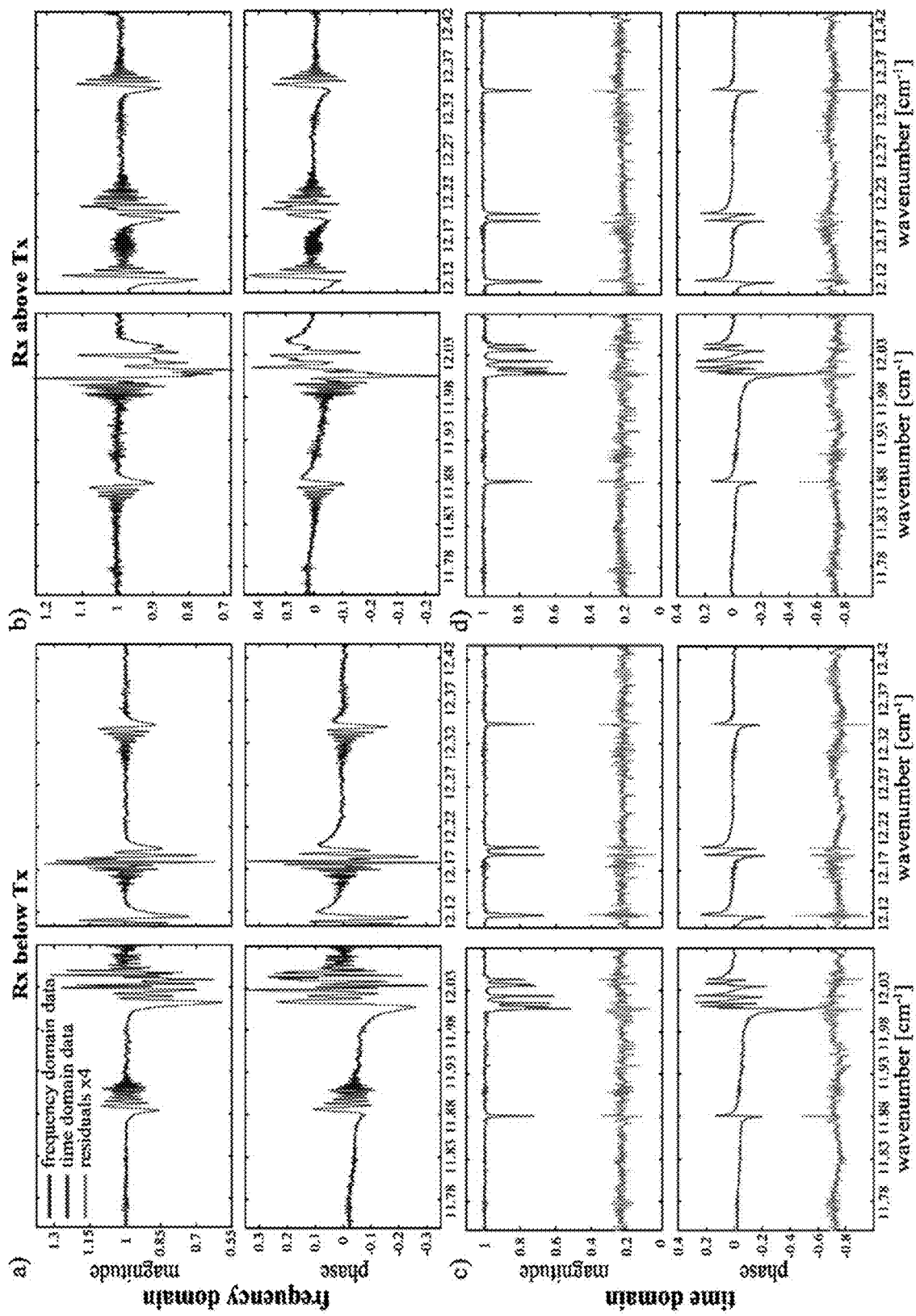
FIG. 13 shows, according to some embodiments, magnitude and phase spectra of formic acid 95% purity) around 12.1 $cm^{-1}$ in a 1 m long gas cell at 133 Pa pressure. (a) The quadratic phase response from the LO chirp causes the ripples to move towards the center frequency (between sub-panels). (b) The quadratic phase response causes the ripples to move away from the laser center frequency. (c) The time domain (steady state) spectra in red correspond to the temporally magnified spectra in (a). (d) The steady state spectra in red correspond to the temporally magnified spectra in (b). The residuals from the fits to the HITRAN database are shown in orange (offset for clarity) in (c) and (d).

For the first data set, the ECDL was tuned to ≈11866 cm$^{-1}$, while the Ti:Sapp was fixed at ≈11878 cm$^{-1}$ to generate a difference frequency THz comb centered at 12.08 cm$^{-1}$. Following the empty cell acquisition, the 1 m long evacuable gas cell was filled with up to 667 Pa of ≈95% formic acid (residual 5% water vapor). FIG. 13 shows the resulting frequency and time domain spectra obtained at room temperature and 133 Pa pressure for the two different Rx chirped pulses (see FIG. 8). The frequency domain spectra shown in FIG. 13a and FIG. 13b contain oscillations from each resonance from rapid passage effects. FIG. 13a shows the spectra for $\Delta f_{LO} < \Delta f$, resulting in ripples that are dampened toward the comb's center frequency. In contrast, for $\Delta f_{LO} > \Delta f$ in FIG. 13b, the ripples extend away from the comb's center frequency. Since this region contains multiple lines of formic acid, the responses significantly overlap when temporally magnified, and therefore, exhibit distinct spectra depending on the direction of the rapid passage signals.

However, after applying the inverse Fourier transformation to the time domain as described above, the corresponding steady state spectra shown in FIG. 13c and FIG. 13d are nearly identical regardless of the RF chirp direction. The overall amplitudes of the time domain spectra are fit using the HITRAN relative line strengths and width parameters in a nonlinear least-squares algorithm. The fit residuals (×4) are shown below the spectra. Evidence of some line shape error and phase drift are present in the magnified residuals, resulting in spikes and baseline drift, respectively. Additional spectra and fits are provided for regions near 15.7 cm$^{-1}$ and 19.3 cm$^{-1}$.

Figure 14:
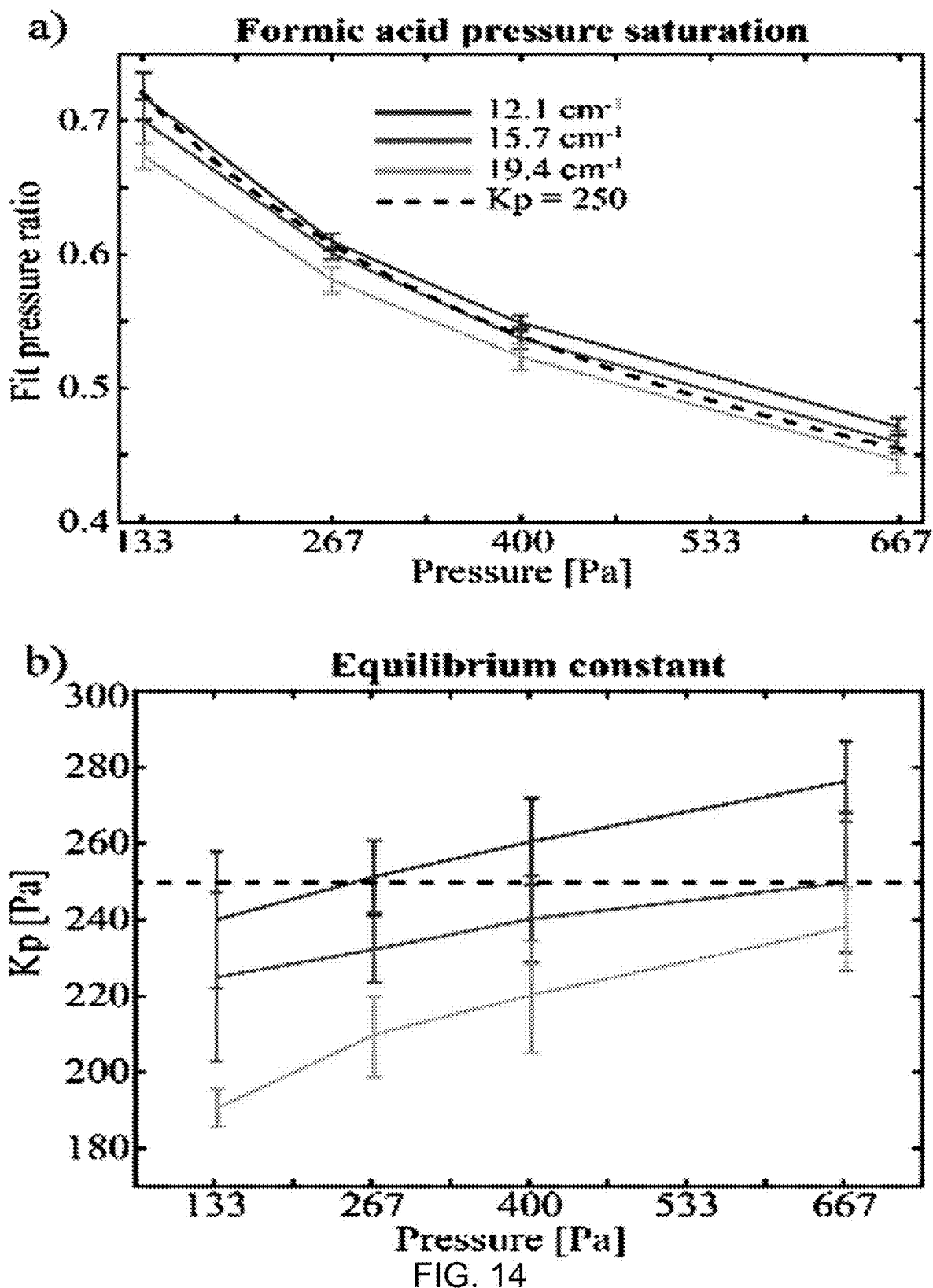
FIG. 14 shows, according to some embodiments, results of fitting the pressure of the time domain spectra acquired at 133 Pa, 267 Pa, 400 Pa and 667 Pa using fixed HITRAN relative amplitudes and width parameters. (a) The pressure dependence of the best fit pressure ratio relative to HITRAN predictions in three spectral regions. The pressure ratio for $K_P$=250 is shown as a dashed black line. (b) Fits of equilibrium constant, $K_P$, for the same data sets, showing a slight model dependence on pressure in the different regions.

FIG. 14a shows the ratios of the fitted pressure to the actual pressure for three regions and at four different pressures. As the actual pressure is increased, the pressure from the fits decrease to less than half of the actual value. Formic acid vapor at room temperature exists in an equilibrium between the monomer and several possible dimeric forms. The formation of dimers results in a reduction of the monomeric partial pressure, $P_{FAM}$, and consequently, the measured line intensities as the pressure is increased. The equilibrium constant in the mid-IR region has been estimated from the pressure dependent band intensities using, $K_P = P_{FAM}^2/P_{FAD}$ where $P_{FAD}$ is the dimer partial pressure and reported to be 361(45) Pa. The actual monomer pressure is defined as, $$P_{FAM} = \frac{-K_p + \sqrt{K_p^2 + 4K_p P_{TOT}}}{2} \quad (6)$$

where $P_{TOT}$ is the actual pressure. The sample used in our work contained 5% water by weight and therefore, the $K_P$ is expected to change relative to the mid-IR value. As shown with a dashed black line in FIG. 14a, the predicted pressure decrease using an estimated value of $K_P = 250$ Pa are in reasonable agreement with the observed trends.

For a more quantitative comparison, $K_P$ was used as a floated parameter in the nonlinear least squares fitting process. The fits are performed separately using the magnitude and phase spectra of each sideband spectrum and for both Rx chirped pulses. FIG. 14b shows the results of the $K_P$ fits where the uncertainties were estimated from the range of values obtained for these different fits (type B, k=1 or 1σ). With increasing pressure, the $K_P$ values are seen to increase slightly and the overall $K_P$ values are somewhat higher for the lower frequency ranges. Further studies are needed to explain these anomalous trends which may have origin in a rotational state dependence of the rates to transient complex formation affecting the equilibrium constant and/or higher order terms in the equilibrium constant associated with trimers and water complexes.

Accordingly, the method described herein provides the temporally magnified and steady state spectra from the down converted RF comb teeth in the frequency and time domains, respectively. The DCP-DF-EOFC system has been used to investigate the complex transmission and dispersion profiles of formic acid over three spectral regions from 362 GHz to 581 GHz. The frequency domain spectra contain distinct rapid passage effects that drastically change the appearance of the spectra depending on the defined properties of the LO chirp relative to the probe chirp. The time domain spectra of formic acid are well fit to HITRAN predictions after accounting for the gas phase equilibrium between the monomer and dimers forms at room temperature.

S1. Differential Chirp Down Conversion

The down conversion of the spectral information on the optical probe chirp into the RF domain is based on the mixing with a local oscillator (LO) chirp having the same repetition rate, but different chirp ranges. The electro-optic modulator (EOM) generates both positive and negative (±)

sidebands and higher orders (harmonics) at the microwave driving field around the laser carrier frequency. While the (±) EOM sidebands are separated by the difference in acousto-optic modulator (AOM) driving frequencies, the EOM orders are more difficult to separate. The modulation of order k on the probe chirp can be described as a sine wave with a quadratic phase term, $$E_{probe}^k(t) = \tilde{F}\tilde{k}_{probe}(t)\sin\left(2\pi f_{opt}t + 2\pi k\left(f_0 t + \frac{\Delta f}{2\tau_{CP}}t^2\right)\right) \quad (S1)$$

where $f_{opt}$ is the optical carrier frequency, $f_0$ is the starting frequency of the chirp, $\Delta f$ is the chirp range of the probe, $T_{CP}$ is the chirp duration, and $\tilde{E}_{probe}$ is the electric field strength of the probe chirp. The LO chirp can be defined similarly as, $$E_{LO}^k(t,i) = \quad (S2)$$
$$\tilde{F}\tilde{k}_{LO}(t)\sin\left(2\pi f_{opt}t + 2\pi k\left(f_{LO}t + \frac{\Delta f_{LO}}{2\tau_{CP}}t^2\right) - \frac{2\pi k}{N_{chirps}}\left(\frac{t}{\tau_{CP}} + i\right)\right)$$

where $f_{LO}$ is the starting frequency of the LO, $\Delta f_{LO}$ is the chirp range of LO, and $\tilde{E}_{LO}$ is the electric field strength of the LO chirp. The probe chirp is repeated $N_{chirps}$ times, while the different LO chirped pulses, i, are phase shifted by $2\pi k$ over the $N_{chirps}$ waveforms.

In order to down convert the spectral information on the probe chirp, the combined probe and LO chirped pulses are mixed at a photomixer. The square law detector output gives us both the square of the two field amplitudes and their cross product.

$$(E_{probe}^k(t)+E_{LO}^k(t))^2 = E_{probe}^k(t)^2 + E_{LO}^k(t)^2 + 2E_{probe}^k(t)E_{LO}^k(t) \quad (S3)$$

Using the product angle formula, we can express the product of the probe and LO chirped fields (Eqs. S1 and S2) as the difference and sum terms, $$E_{probe}^k(t)E_{LO}^k(t) = \quad (S4)$$
$$\frac{\tilde{F}\tilde{k}_{probe}(t)\tilde{F}\tilde{k}_{LO}(t)}{2}\left(\begin{array}{c}\cos\left(2\pi k\left((f_0 - f_{LO})t + \frac{(\Delta f - \Delta f_{LO})}{2\tau_{CP}}t^2\right) + \\ \frac{2\pi k}{N_{chirps}}\left(\frac{t}{\tau_{CP}} + i\right)\right) \\ -\cos\left(4\pi f_{opt}t + 2\pi k\left((f_0 + f_{LO})t + \\ \frac{(\Delta f + \Delta f_{LO})}{2\tau_{CP}}t^2\right) - \frac{2\pi k}{N_{chirps}}\left(\frac{t}{\tau_{CP}} + i\right)\right)\end{array}\right)$$

The high frequency components (second term in Eq. S4) are filtered at the detector, leaving the remaining difference frequency term that defines the RF field, $RF^k(t)$, $$RF^k(t) = I_{RF}^k(t)\cos\left(\pm 2\pi k\left(\delta f_0 t + \frac{\delta f_{BW}}{2\tau_{CP}}t^2\right) + \frac{2\pi k}{N_{chirps}}\left(\frac{r}{\tau_{CP}} + i\right)\right) \quad (S5)$$

where $\delta f_0$ is the difference in starting frequencies, $\delta f_{BW}$ is the difference in chirp ranges, and $I_{RF}$ is the product of the probe and LO electric fields over 2. Eq. S5 gives a chirped pulse in the RF domain that downconverts the spectral information of the probe electric field. The RF chirp starts at $\delta f_0 = f_0 - f_{LO}$ and sweeps over the bandwidth $\delta f_{BW} = \Delta f - \Delta_{LO}$.

Figure 15:
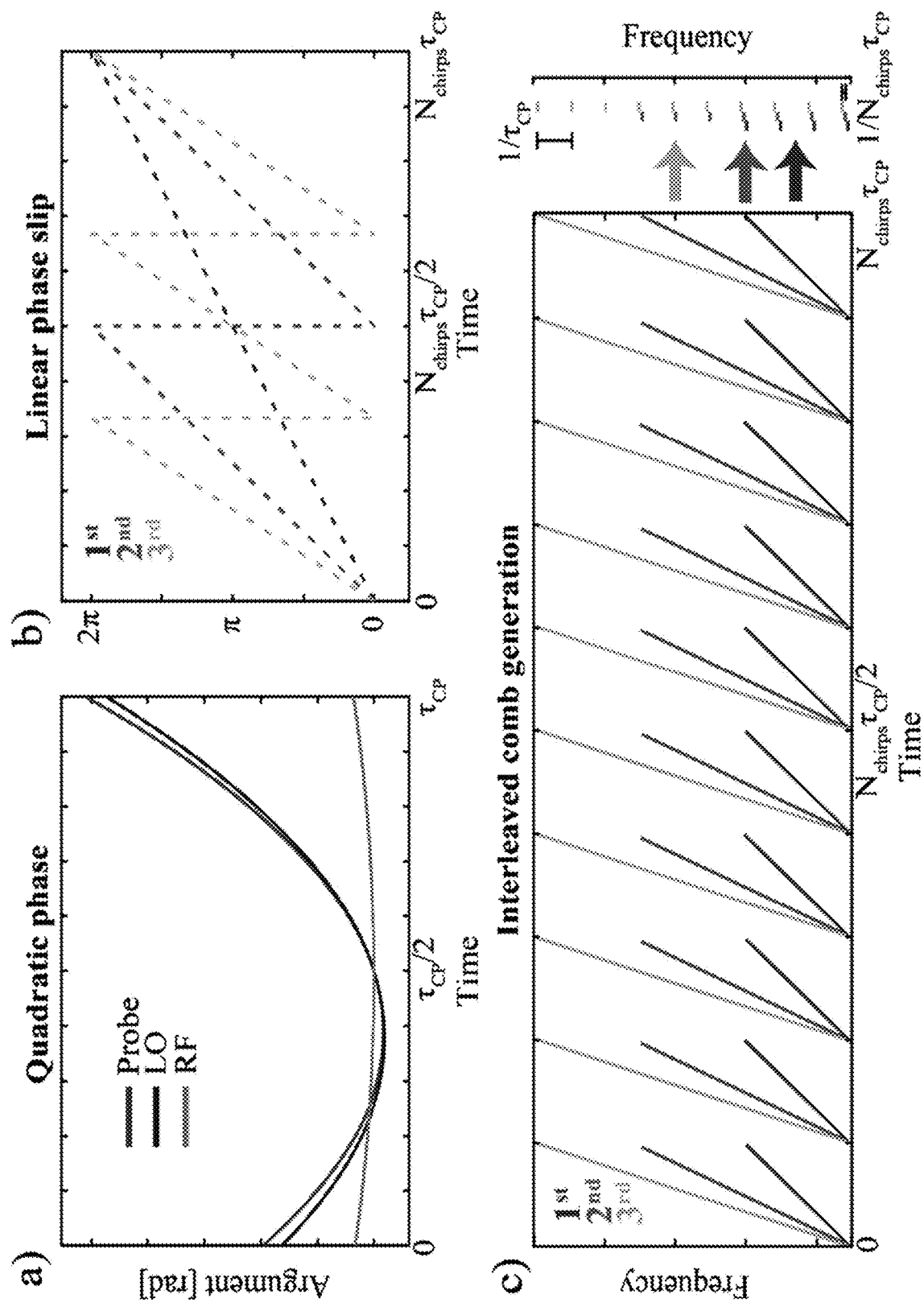
FIG. 15 shows, according to some embodiments, (a) a trigometric argument of the probe chirp is shown in red, the LO chirp in purple, and the RF chirp in light blue. The two optical chirps are dominated by the quadratic phase terms that define the linear chirp ranges (the instantaneous angular frequency is the derivative of the phase), and the RF chirp range also has the quadratic shape defined by their difference. (b) The linear phase shift term that separates high orders (harmonics) of the EOMs by generating a beat note over a fixed set of chirps. (c) The RF comb is generated in the frequency domain by sampling over a repeating series of chirps. The RF scan range scales with the order while the comb teeth centers over consecutive orders are sequentially separated by the linear phase shift in (b).

The chirp is repeated to form a comb in the RF spectrum whose bandwidth is defined by the quadratic term, $\delta f_{BW}$, in Eq. S5. The sine arguments of the probe and LO chirps (i.e., Eqs. S1 and S2) are plotted in FIG. 15a, in red and purple, respectively. The shapes of the quadratic forms are defined by the chirp ranges while the horizontal offsets of the minima are defined by the starting frequencies. The difference between the two quadratic functions is another quadratic (light blue) that generates the down-converted linear chirp in the RF domain. The linear frequency shift that is scaled by $N_{chirps}$ is illustrated in FIG. 15b as the wrapped phase over the series of waveforms for the first three orders. Because the magnitude of the linear phase shift (or corresponding frequency shift) scales with the order of EOM modulation, the different orders are separated in the RF spectrum. The comb is formed by Fourier transforming a repeated series of chirps shown in FIG. 15c, where each order spans the k scaled frequency ranges for the same chirp duration. The comb has teeth that are separated by the inverse of the chirp duration, $\tau_{cp}$, while the different orders are separated by the $1/(N_{chirps}\tau_{Cp})$ in the RF comb.

For the first order, k=1, and ignoring the phase shift scaled by $N_{chirps}$, the RF waveform generated by mixing two chirped pulses simplifies to, $$RF(t) = I(t)\cos\left(\pm 2\pi\left(\delta f_0 t + \frac{\delta f_{BW}t^2}{2\tau_{CP}}\right)\right), \quad (S6)$$

which is the same as Eq. 2.

S2. Magnified Temporal Dynamics

When the probe field interacts with the sample (assuming a linear response), the output can be described as a linear combination of the transient response of the sample to each frequency in the chirp. We can first write the general single frequency transient response as, $$E_{trans}(t) = \tilde{E}_{trans}(t)\sin(2\pi f_{trans}t) \quad (S7)$$

where $\tilde{E}_{trans}$ is the dampened envelope of the transient oscillation at frequency $f_{trans}$. When this is mixed with the LO at the detector, the resulting RF waveform contains a quadratic term defined by the LO chirp. Following Eq. S3 and Eq. S4, we retain only the difference term of the product between the transient field and the LO chirp and write, $$RF_{trans}(t) = LPF\{E_{trans}(t)E_{LO}^k(t)\} = \quad (S8)$$
$$I_{trans}(t)\cos\left(2\pi\left(\delta f_{trans}t - \frac{k\Delta f_{LO}}{2\tau_{CP}}t^2\right) + \frac{2\pi k}{N_{chirps}}\left(\frac{t}{\tau_{CP}} + i\right)\right)$$

where $\delta f_{trans}$ is the beat note between the LO and transient frequency, and $I_{trans}(t)$ is the intensity of the fields detected after low pass filtering (LPF) for the difference term. Instead of having a quadratic term that is the difference between two chirps, the spectral mapping of the transient signal is defined by the LO chirped pulse alone. When the series of repeated chirps is Fourier transformed to form a comb in the frequency domain, the transient responses are magnified by the quadratic phase of the LO chirp. However, when the inverse Fourier transform is applied, a linear scan response in time is recovered to reveal the normal time domain spectral response of the sample. This results in four different spectra recovered from each data set which include the magnitude and phase for each of the time and frequency domain spectra.

For the first order, k=1, and ignoring the phase shift scaled by $N_{chirps}$, the RF waveform generated by mixing a transient response and the LO chirp simplifies to, $$RF_{trans}(t) = I_{trans}(t)\cos\left(2\pi\left(\delta f_{trans}t - \frac{\Delta f_{LO}t^2}{2\tau_{CP}}\right)\right), \quad (S9)$$

Which is the same as Eq. 3.

S3. Fourier Transform of a Linear Chirp

The linear frequency chirp is defined by a quadratic phase term in a complex exponential. To give insight into the Fourier transform of a chirped pulse, it is convenient to look at the exponential form of the chirped pulse function given in Eqs. S1 and S2, $$E_{chirp}(t) = a\exp\left(i\left(bt + \frac{\Delta\omega}{2\tau_{CP}}t^2 + c\right)\right) \quad (S10)$$

where a, b, and c are constants defining the amplitude, linear time dependence, and phase offset, respectively. In radial units ($\Delta\omega=2\pi\Delta f$), the terms that define the quadratic dependence are the chirp range, $\Delta\omega$, and the chirp duration, $T_{CP}$. We can separate the linear (plus constant) and quadratic terms into, $$E_{chirp}(t) = a\exp(ic)\exp(ibt)\exp\left(i\frac{\Delta\omega}{2\tau_{CP}}t^2\right) = s(t)h(t) \quad (S11)$$

so we have both linear, s(t), and quadratic, h(t), functions of time The Fourier transform of their product can be written as the Fourier transform of h(t) with a frequency shift defined by b in s(t), $$FT\{E_{chrip}(t)\}=FT\{s(t)h(t)\}=\alpha H(\omega-b)\exp(ic) \quad (S12)$$

The Fourier transform of the quadratic term h(t) can be defined as, $$FT\{h(t)\} = H(\omega) = \sqrt{\frac{\tau_{CP}}{\Delta\omega}}\exp\left(i\left(-\frac{\tau_{CP}}{2\Delta\omega}\omega^2 + \frac{\pi}{4}\right)\right) \quad (S13)$$

These combine to give the full transform of the chirped pulse function, $$FT\{E_{chirp}(t)\} = a\sqrt{\frac{\tau_{CP}}{\Delta\omega}}\exp\left(i\left(\frac{\tau_{CP}b}{\Delta\omega}\omega - \frac{\tau_{CP}}{2\Delta\omega}\omega^2 - \frac{\tau_{CP}b^2}{2\Delta\omega} + \frac{\pi}{4} + c\right)\right) \quad (S14)$$

or more generally, $$E_{chirp}(\omega) = A\exp\left(i\left(B\omega - \frac{\tau_{CP}}{2\Delta\omega}\omega^2 + C\right)\right) \quad (S15)$$

where, A, B, and C are constants defined in terms of the initial constants, chirp range, $\Delta\omega$, and chirp duration, $T_{cp}$.

This simplified example results in an equation very similar in form to Eq. S10, where there is a linear term defined by the constant B, and a quadratic term defined by the chirp duration and chirp range. The Fourier transform of a chirp pulse is treated here in its simplest form, since any increase in the function argument complexity would require a numerical solution to solve for the transform.

This transform property of the linear chirps permits the acquisition of unique spectra in each domain where these different chirped pulse forms are represented. The quadratic phase term appearing in both Eq. S10 and Eq. S15 serve to linearly transform information from one domain to the other. Terms that are multiplied in the time domain will be convolved in the frequency domain and result in a unique spectral response depending on the time/frequency dependence of the sample response.

Figure 16:
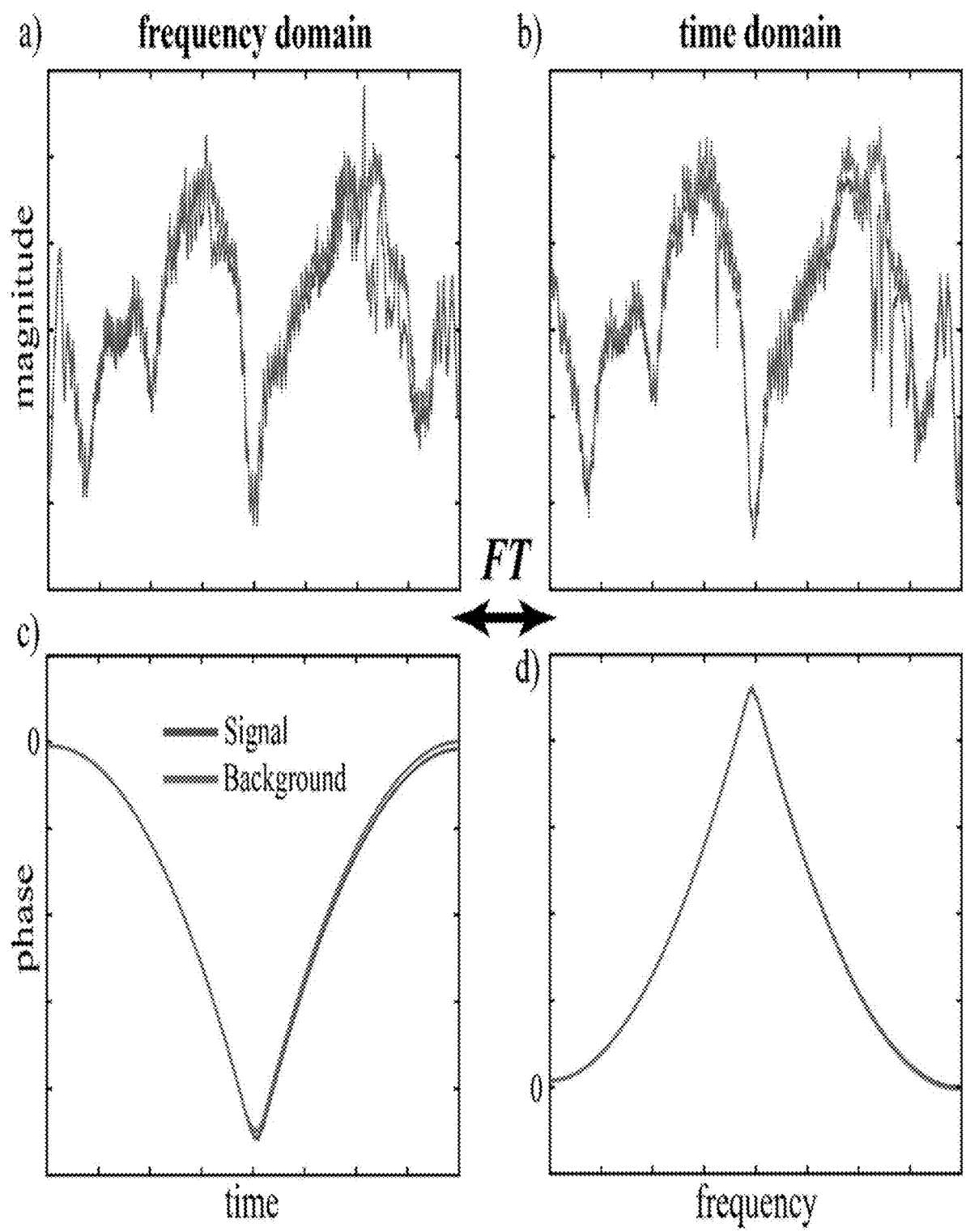
FIG. 16 shows, according to some embodiments, a) frequency domain magnitude spectra where the sampled comb lines of the signal are shown in blue, and those of the background spectra in red. b) The time domain spectra obtained from the inverse Fourier transform of the frequency domain spectra (a,c). c) The quadratic phase response of the frequency domain spectra, and d) of the time domain spectra.

The directly sampled comb spectra (magnitude and phase) for a single sideband is shown in FIG. 16, with the signal spectra in blue and the background spectra in red. FIG. 16a shows the sample response in the frequency domain that contains asymmetric oscillations near resonances with regions that exceed the background level. In contrast, the time domain spectra in FIG. 16b show distinct and symmetric features in transmission. The corresponding phase spectra in FIG. 16c and FIG. 16d are dominated by the quadratic phase terms that enable these transforms. The quadratic phases are shifted by the linear terms, and as predicted by Eqs. S10 and S15, the sign of the overall phase is reversed in the two domains.

S4. Maxwell-Bloch Equations: Rapid Passage Effects

Rapid passage effects in molecular systems have been treated in detail before using the following set of differential equations. The Feynman-Bloch vector components, u, v, and w, are solved for the sweep rate, a. The following set of equations are solved numerically, $$\dot{u}=-(\Delta-\dot{\phi})v-u/T_2 \quad (S16)$$

$$\dot{v}=+(\Delta-\dot{\phi})u+\Omega\omega-v/T_2 \quad (S17)$$

$$\dot{w}=\Omega v-(w-w_{eq})/T_1 \quad (S18)$$

where $\Delta$ is the frequency detuning from resonance, $w_{eq}$ is the steady state population inversion ($w_{eq}=-1$) and $T_1$ and $T_2$ are the population and polarization relaxation times, respectively. The rabi frequency, $\Omega$, is related to the applied electric field amplitude by $\Omega=d_{ij}E/\hbar$, where $d_{ij}$ is the transition dipole moment of the absorption line and h is the reduced Planck's constant. The complex envelope function $\tilde{E}(z, t)=E(z, t)\exp(-i\phi(z, t))$ describes the amplitude and phase of the electric field along the laser propagation direction, z.

The field at every point, z, over the pathlength, $L_{abs}$, is evaluated using Eqs. S16-S18 at discrete time steps to determine the field amplitude and phase at the detector. Averages are performed over the Boltzmann velocity components and dipole moment projections on the laser's electric field direction after accounting for degeneracies. In the retarded time reference frame where Z=z and T=t−z/c, the Rabi field and phase evolve in the propagation dimension with respect to the Feynman-Bloch vectors as, $$\frac{\partial\Omega}{\partial Z} = \frac{\mu}{4}\langle v(Z, T)\rangle \quad (S19)$$

$$\frac{\partial\phi}{\partial Z} = -\frac{\mu}{4}\frac{\langle u(Z, T)\rangle}{\Omega} \quad (S20)$$

where $\mu=Nd_{ij}^2\omega_0/\epsilon_0\hbar c$ and N is the number density, $\omega_0$ is the center frequency of the absorption line, and $\epsilon_0$ is free space permittivity.

Figure 17:
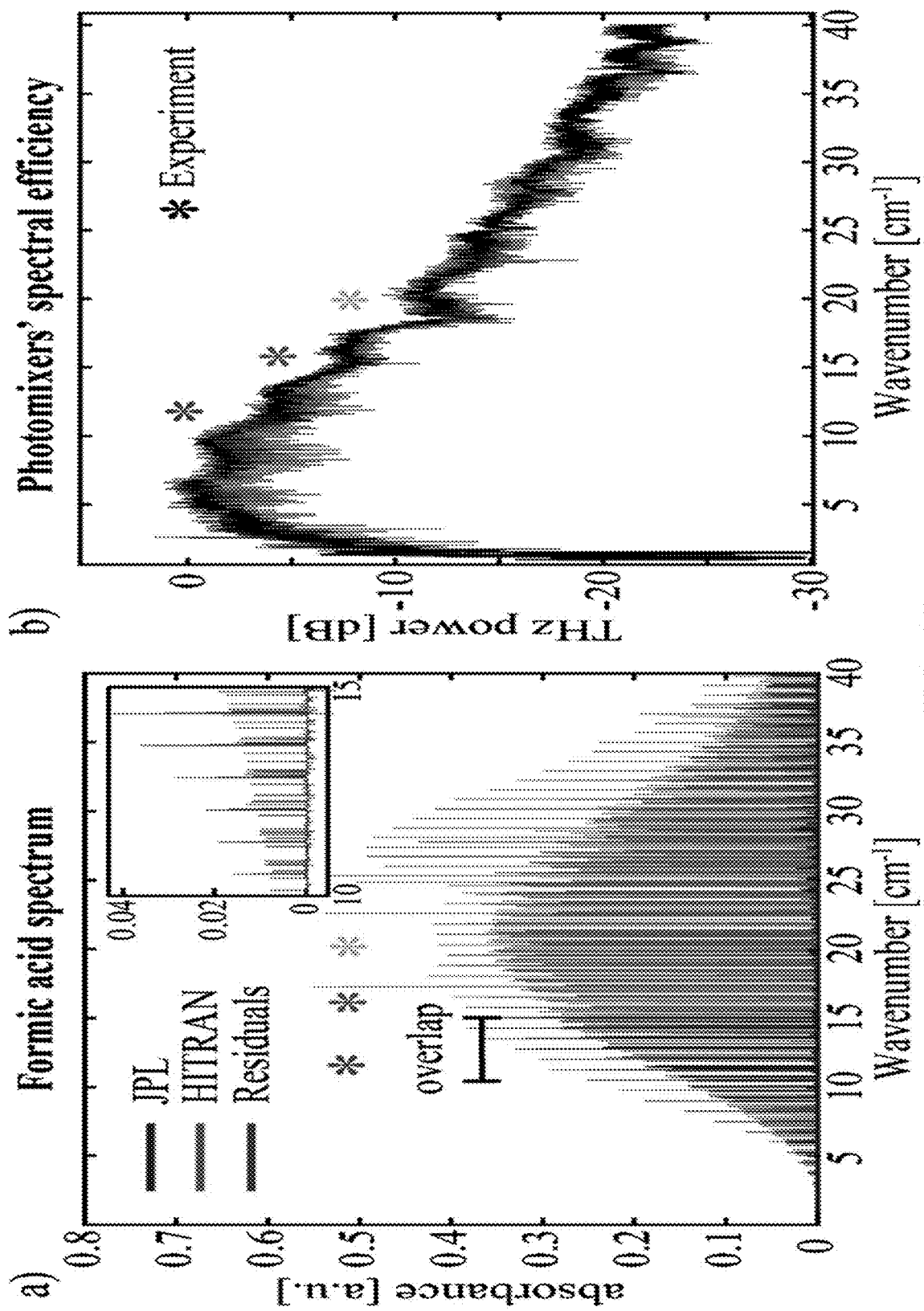
FIG. 17 shows, according to some embodiments, (a) models of the THz spectrum of formic acid from 1 $cm^{-1}$ to 40 $cm^{-1}$. The HITRAN database, in green, only reports the line parameters above 10 $cm^{-1}$, so the low frequency region is filled in with predictions from the JPL database, in purple. The residuals from the overlapped region are shown in the inset (red) which indicates a slightly difference in the line intensities between the two databases. (b) The power spectrum obtained from the THz photomixer pair through an evacuated 1 m long cell.

S5. Additional Data:

The dual chirped-pulse difference-frequency electro-optical frequency comb system is used to perform gas phase spectroscopy of formic acid. FIG. 17a shows predictions of the absorption spectrum of the formic acid monomer from 1 $cm^{-1}$ to 40 $cm^{-1}$, or 30 GHz to 1.2 THz. The HITRAN database spectrum shown in green spans down to 10 $cm^{-1}$ where it overlaps by $\approx$5 $cm^{-1}$ with the JPL database spectrum shown in purple. The difference in line intensities is illustrated by the residuals between the two spectra over the 10 $cm^{-1}$ to 15 $cm^{-1}$ region shown as a inset in red. In this manuscript, we scan over three spectral regions centered at 12.1 $cm^{-1}$, 15.7 $cm^{-1}$, and 19.3 $cm^{-1}$ (362 GHz, 472 GHz, and 581 GHz, respectively), illustrated in FIG. 17 by asterisks. The measured power spectrum of the Tx and Rx photomixer pair is shown in FIG. 17b. The peak power detected is near 5 $cm^{-1}$ and logarithmically decreases as the frequency is increased. Over the three spectral ranges probed, the power drops by roughly four-fold, resulting in a corresponding decrease in signal to noise (SNR). For each region, two sets of data were collected at sample pressures of 133 Pa, 267 Pa, 400 Pa, and 667 Pa, with the only difference being the chirp parameters used for the Rx comb. Each data set produces four different spectra which includes the magnitude and phase in both the frequency and time domains. The frequency domain spectra show unique line shapes that depend on the parameters of the Rx comb and dampen with increased pressure, while the time domain spectra show the normal evolution of a pressure-broadened Voigt line shape with increasing pressure.

Figure 18:
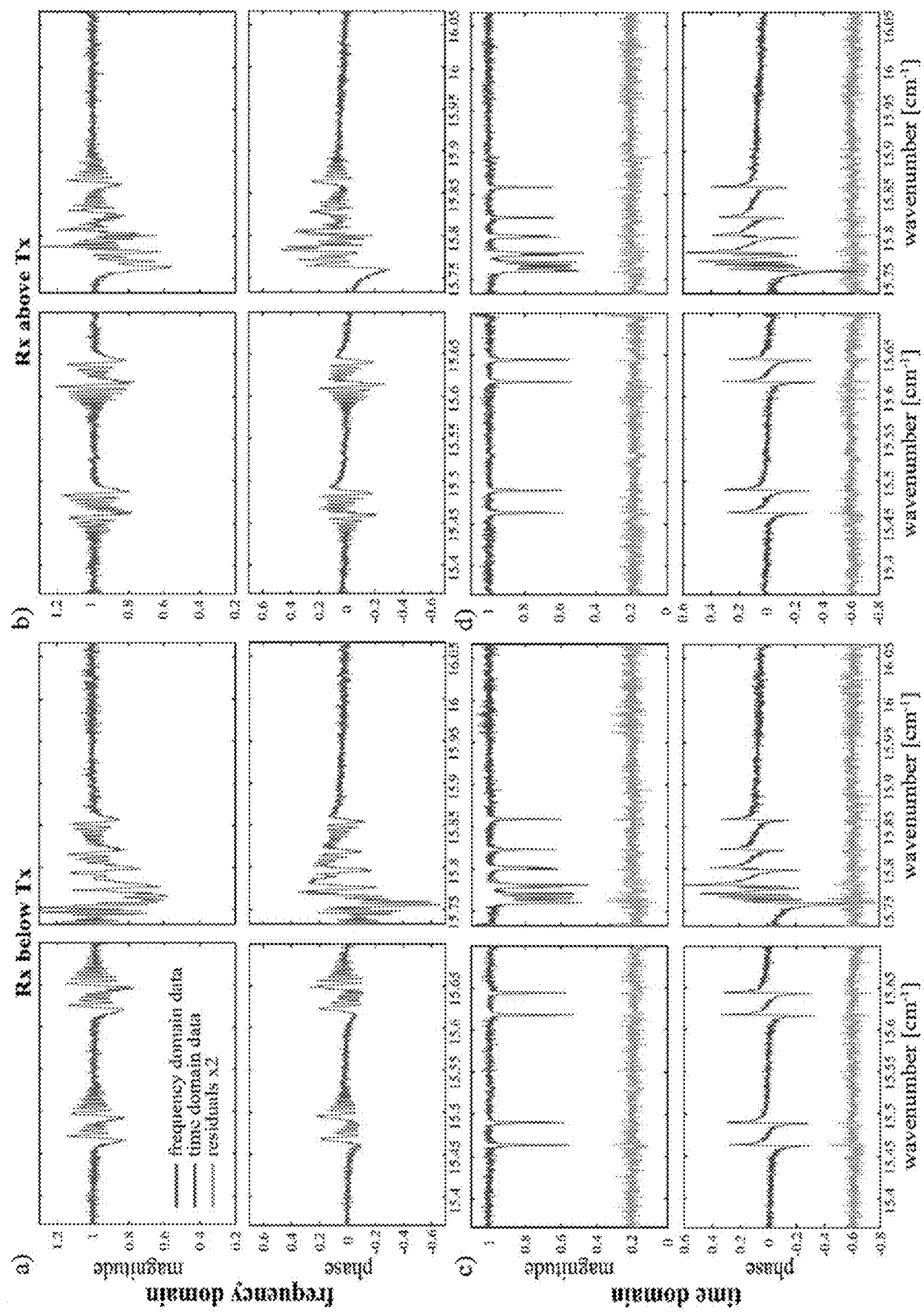
FIG. 18 shows, according to some embodiments, magnitude and phase spectra of formic acid around 15.7 $cm^{-1}$ in a 1 m long cell at a pressure of 133 Pa. (a) The quadratic phase shift from the comb causing the ripples to move towards the center frequency. (b) The quadratic phase shift causes the ripples to move away from the laser center frequency. (c) The steady state spectra in red correspond to the temporally magnified spectra above in (a). (d) The steady state spectra in red correspond to the temporally magnified spectra above in (b), and the residuals from the HITRAN fits (offset for clarity) are shown below in orange.

Following the measurements at 12.08 $cm^{-1}$ as illustrated in FIG. 13, the ECDL laser was tuned to approximately 11762 $cm^{-1}$, centering the THz spectrum near 15.72 $cm^{-1}$ (472 GHz). Due to the reduced efficiency at both the Tx and Rx photomixers, the SNR is reduced by roughly two-fold for this spectral region. FIG. 18a shows the magnitude and phase of the temporally magnified spectra showing the direction of rapid passage response moving towards the comb's center frequency. In contrast, the other Rx chirp produces the rapid passage response shown in FIG. 18b where the damping oscillations move away from the center frequency. The time domain spectra in FIG. 18c and FIG. 18d correspond to the frequency domain spectra shown above them in FIG. 18a and FIG. 18b, respectively. The unscaled residuals from HITRAN fits (offset for clarity) are scaled by two and shown below in orange.

Figure 19:
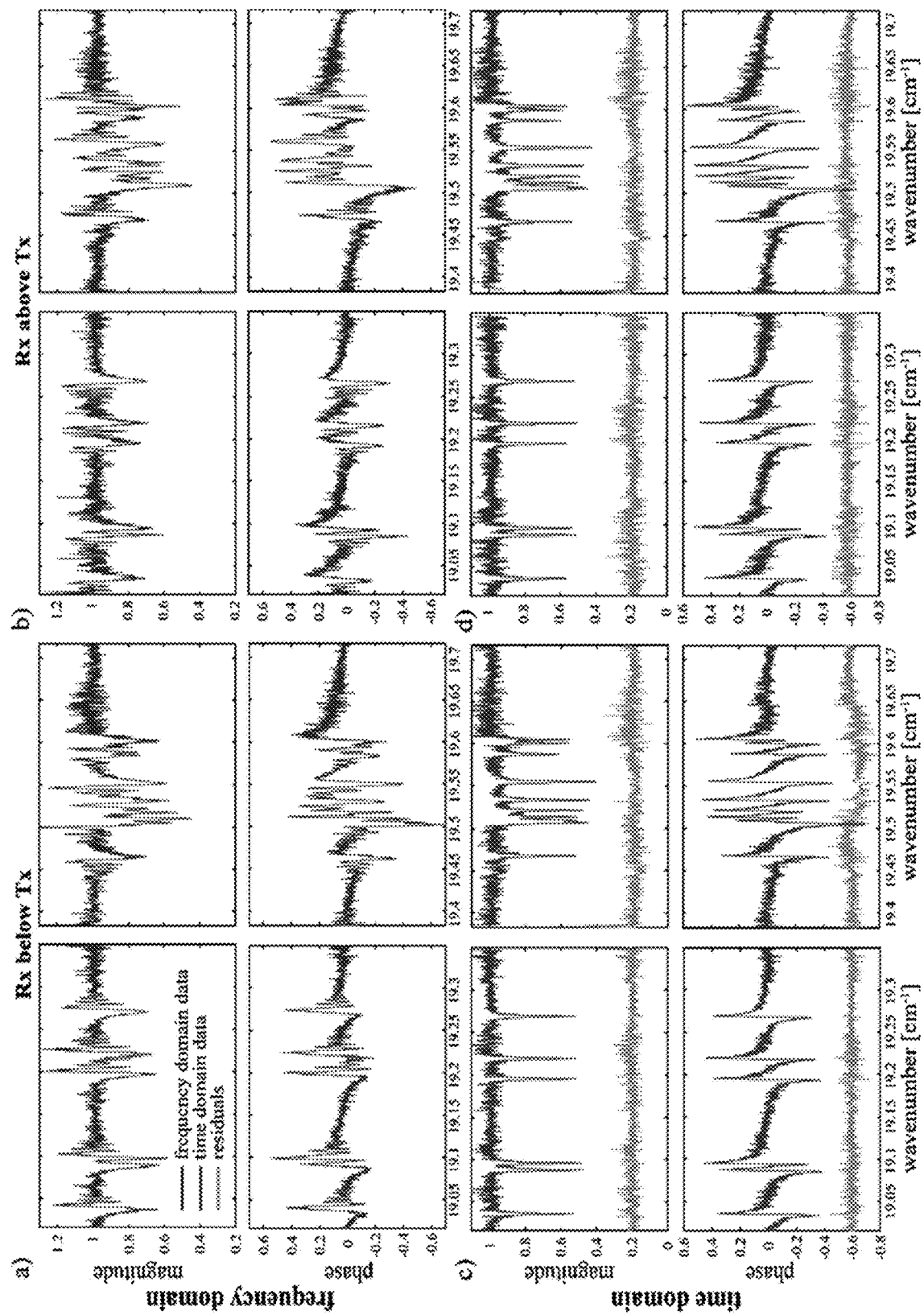
FIG. 19 shows, according to some embodiments, magnitude and phase spectra of 95% formic acid around 19.35 $cm^{-1}$ in a 1 m long cell at a pressure of 267 Pa. (a) The quadratic phase shift from the comb causing the ripples to move towards the center frequency. (b) The quadratic phase shift causes the ripples to move away from the laser center frequency. (c) The steady state spectra in red correspond to the temporally magnified spectra above in (a). (d) The steady state spectra in red correspond to the temporally magnified spectra above in (b), and the residuals to the HITRAN fits (offset for clarity) are shown below in orange.

The ECDL laser was then tuned to approximately 11758 $cm^{-1}$, centering the THz spectrum around 19.35 $cm^{-1}$ (581 GHz), and resulting in another reduction in SNR by a factor of two. FIG. 19 shows the formic acid spectra at 267 Pa pressure. FIG. 19a illustrates the magnitude and phase of the temporally magnified spectra showing the rapid passage chirp direction moving towards the comb's center frequency. The other Rx chirp produces the rapid passage chirp direction shown in FIG. 19b, moving away from the center frequency. The time domain spectra in FIG. 19c and FIG. 19d correspond to the frequency domain spectra above them in FIG. 19a and FIG. 19b, respectively. Residuals from HITRAN fits are shown below in orange (offset for clarity).

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A temporal magnification spectrometer for performing spectroscopic temporal magnification, the temporal magnification spectrometer comprising:
    a dual-chirp comb source that produces optical carrier laser light;
    a signal leg in optical communication with the dual-chirp comb source and that:
        receives the optical carrier laser light from the dual-chirp comb source;
        produces a signal comb comprising a series of signal linearly chirped waveforms characterized by a chirp duration $\tau_{cp}$ and a signal frequency range $\Delta f_{SIG}$; and
        interacts the signal comb with a sample over the signal frequency range $\Delta f_{SIG}$ to produce a transmitted signal comb;
    a local oscillator leg in optical communication with the dual-chirp comb source and that:
        receives the optical carrier laser light from the dual-chirp comb source; and
        produces a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$;
    an optical detector in optical communication with the signal leg and the local oscillator leg and that:
        receives the transmitted signal comb from the signal leg;
        receives the local oscillator comb from the local oscillator leg; and
        produces an RF domain signal from mixing the transmitted signal comb and the local oscillator comb; and
    a temporal magnification analyzer in communication with the optical detector and that:
        receives the RF domain signal from the optical detector;
        subjects the RF domain signal to a Fourier transform to produce an RF comb comprising a series of RF linearly chirped waveforms;
        samples the RF comb to produce sampled RF comb lines from the RF comb;
        normalizes the magnitude and phase response of the sampled RF comb lines and produces temporally magnified sample frequency domain data from the sampled RF comb lines;
        subjects the sampled RF comb lines to an Inverse Fourier transform to produce intermediate sample temporal data; and
        normalizes the magnitude and phase response of the intermediate sample temporal data to produce a steady-state sample spectral response from the intermediate sample temporal data.

2. The temporal magnification spectrometer of claim 1, wherein the dual-chirp comb source comprises a single free-running laser.

3. The temporal magnification spectrometer of claim 1, wherein the dual-chirp comb source comprises a dual laser configuration comprising two independent free-running lasers.

4. The temporal magnification spectrometer of claim 3, wherein the temporal magnification spectrometer with the dual laser configuration provides sum frequency generation and difference frequency generation.

5. The temporal magnification spectrometer of claim 1, wherein the signal leg comprises a signal modulator that receives the optical carrier laser light from the dual-chirp comb source and produces the signal comb.

6. The temporal magnification spectrometer of claim 5, wherein the signal modulator comprises an electro-optical phase modulator that produces the signal comb from the optical carrier laser light.

7. The temporal magnification spectrometer of claim 5, wherein the signal modulator directly modulates the optical carrier laser light with a chirped waveform microwave source that produces the signal comb from the optical carrier laser light.

8. The temporal magnification spectrometer of claim 1, wherein the local oscillator leg comprises a signal modulator that receives the optical carrier laser light from the dual-chirp comb source and produces the local oscillator comb.

9. The temporal magnification spectrometer of claim 8, wherein the signal modulator comprises an electro-optical phase modulator that produces the local oscillator comb from the optical carrier laser light.

10. The temporal magnification spectrometer of claim 8, wherein the signal modulator directly modulates the optical carrier laser light with a chirped waveform microwave source that produces the local oscillator comb from the optical carrier laser light.

11. The temporal magnification spectrometer of claim 1, wherein the temporal magnification analyzer comprises a transform unit that subjects the RF domain signal to the Fourier transform and produces the RF comb.

12. The temporal magnification spectrometer of claim 1, wherein the temporal magnification analyzer comprises a comb line sample unit that samples the RF comb and produces the sampled RF comb lines from the RF comb.

13. The temporal magnification spectrometer of claim 1, wherein the temporal magnification analyzer comprises a temporal magnification normalization unit that normalizes the magnitude and phase response of the sampled RF comb lines ad produces the temporally magnified sample frequency domain data from the sampled RF comb lines.

14. The temporal magnification spectrometer of claim 1, wherein the temporal magnification analyzer comprises a inverse transform unit that subjects the sampled RF comb lines to the Inverse Fourier transform and produces the intermediate sample temporal data from the sampled RF comb lines.

15. The temporal magnification spectrometer of claim 1, wherein the temporal magnification analyzer comprises a steady-state normalization unit that normalizes the magnitude and phase response of the intermediate sample temporal data and produces the steady-state sample spectral response from the intermediate sample temporal data.

16. The temporal magnification spectrometer of claim 1, wherein the temporal magnification analyzer operates in the near-IR and THz regions and maps optical spectra into the RF region with a resolution spanning more than three decades.

17. A process for performing spectroscopic temporal magnification, the process comprising:
generating a signal comb comprising a series of signal linearly chirped waveforms characterized by a chirp duration $\tau_{cp}$ and a signal frequency range $\Delta f_{SIG}$;
generating a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$;
communicating the signal comb to a sample;
receiving the signal comb by the sample;
interacting the signal comb with the sample over the signal frequency range $\Delta f_{SIG}$ to produce a transmitted signal comb;
communicating the transmitted signal comb and the local oscillator comb to an optical detector;
receiving the transmitted signal comb and the local oscillator comb by the optical detector; and
mixing the transmitted signal comb and the local oscillator comb by the optical detector to produce an RF domain signal that includes spectral information for temporally magnified sample frequency domain data and steady-state sample spectral response.

18. The process of claim 17, further comprising:
subjecting the RF domain signal to a Fourier transform to produce an RF comb comprising a series of RF linearly chirped waveforms;
sampling RF comb lines of the RF comb to obtain sampled RF comb lines;
normalizing the magnitude and phase response of the RF comb to obtain temporally magnified sample frequency domain data;
subjecting the sampled RF comb lines to an Inverse Fourier transform to obtain intermediate sample temporal data; and
normalizing the magnitude and phase response of the intermediate sample temporal data to obtain a steady-state sample spectral response.

19. The process of claim 17, further comprising acquiring a background interferogram between the signal comb and the local oscillator comb in an absence of the sample interacting with the signal comb.

20. A process for performing spectroscopic temporal magnification, the process comprising:
generating a signal comb comprising a series of signal linearly chirped waveforms characterized by a chirp duration $\tau_{cp}$ and a signal frequency range $\Delta f_{SIG}$;
generating a local oscillator comb comprising a series of local oscillator linearly chirped waveforms characterized by the chirp duration $\tau_{cp}$ and a local oscillator frequency range $\Delta f_{LO}$, such that the local oscillator frequency range $\Delta f_{LO}$ is different than the signal frequency range $\Delta f_{SIG}$;
communicating the signal comb to a sample;
receiving the signal comb by the sample;
interacting the signal comb with the sample over the signal frequency range $\Delta f_{SIG}$ to produce a transmitted signal comb;
communicating the transmitted signal comb and the local oscillator comb to an optical detector;
receiving the transmitted signal comb and the local oscillator comb by the optical detector;
mixing the transmitted signal comb and the local oscillator comb by the optical detector to produce an RF domain signal;
subjecting the RF domain signal to a Fourier transform to produce an RF comb comprising a series of RF linearly chirped waveforms;
sampling RF comb lines of the RF comb to obtain sampled RF comb lines;
normalizing the magnitude and phase response of the RF comb to obtain temporally magnified sample frequency domain data;
subjecting the sampled RF comb lines to an Inverse Fourier transform to obtain intermediate sample temporal data; and normalizing the magnitude and phase response of the intermediate sample temporal data to obtain a steady-state sample spectral response.

\* \* \* \* \*